(12) United States Patent
Reeves

(10) Patent No.: US 8,657,521 B2
(45) Date of Patent: Feb. 25, 2014

(54) COLLAPSIBLE STRUCTURES AND JOINTS FOR COLLAPSIBLE STRUCTURES

(75) Inventor: Francis J. Reeves, Severn, MD (US)

(73) Assignee: First Goal LLC, Severn, MD (US)

( * ) Notice: Subject to any disclaimer, the term of this patent is extended or adjusted under 35 U.S.C. 154(b) by 423 days.

(21) Appl. No.: 13/006,384

(22) Filed: Jan. 13, 2011

(65) Prior Publication Data
US 2012/0184399 A1 Jul. 19, 2012

(51) Int. Cl.
*F16B 7/00* (2006.01)

(52) U.S. Cl.
USPC ............................ 403/293; 403/101; 403/314

(58) Field of Classification Search
USPC ............... 403/64, 84, 91, 100–104, 169, 171, 403/174, 176, 293, 314; 473/471, 476–478; 273/398–402; 135/139, 140, 143, 144, 135/148, 151, 156, 121
See application file for complete search history.

(56) References Cited

U.S. PATENT DOCUMENTS

| | | | |
|---|---|---|---|
| 653,796 A | 7/1900 | Ettinger | |
| 884,634 A | 4/1908 | Bragg | |
| 1,036,143 A | 8/1912 | Phillips | |
| 1,405,312 A | 1/1922 | Miller | |
| 1,567,446 A | 12/1925 | McClure | |
| 1,995,420 A | 3/1935 | Fischer | |
| 2,077,343 A | 4/1937 | Oakes et al. | |
| 2,111,448 A | 3/1938 | Hoffman | |
| 2,165,472 A | 7/1939 | Friedman | |
| 2,408,907 A | 10/1946 | Booth | |
| 2,582,864 A | 1/1952 | Gitting et al. | |
| 2,834,321 A | 5/1958 | Duefrene | |
| 2,859,038 A | 11/1958 | Parikos | |
| 2,870,619 A | 1/1959 | Greczin | |
| 2,881,017 A | 4/1959 | Millar, Jr. | |
| 3,223,098 A | 12/1965 | Dole, Jr. | |
| 3,286,804 A | 11/1966 | Bernheim | |
| 3,374,986 A | 3/1968 | McElroy et al. | |
| 3,380,767 A | 4/1968 | Barth | |
| 3,405,721 A | 10/1968 | Crosier et al. | |
| 3,448,748 A | 6/1969 | Walrave | |
| 3,508,770 A | 4/1970 | Cassel | |
| 3,642,282 A | 2/1972 | Frischman | |
| 3,698,715 A | 10/1972 | Browning et al. | |
| 3,979,120 A | 9/1976 | Dietrich | |
| 4,063,830 A | 12/1977 | Ban | |

(Continued)

FOREIGN PATENT DOCUMENTS

| | | | |
|---|---|---|---|
| EP | 0 213 250 A1 | 3/1987 | |
| GB | 1 525 362 A | 9/1978 | |
| GB | 2238572 A | * 6/1991 | ............... F16B 7/14 |

*Primary Examiner* — Joshua Kennedy
*Assistant Examiner* — Jonathan Masinick
(74) *Attorney, Agent, or Firm* — Edell, Shapiro & Finnan, LLC

(57) ABSTRACT

Joint assemblies for collapsible structures include a mating member and a receiving member connected together by a flexible member. The receiving member includes a socket section having a lumen with an internal surface and a longitudinal slot. The mating member includes a tip section that, at a first end thereof, has a non-circular cross-section that provides at least two points of contact with the internal surface of the socket section when the tip section is positioned within the lumen of the socket section. The joint assemblies include a slider that has an internal diameter that varies along the length of the slider to retain the tip section of the mating member within the lumen of the receiving member.

42 Claims, 25 Drawing Sheets

(56) References Cited

U.S. PATENT DOCUMENTS

| | | | |
|---|---|---|---|
| 4,127,272 A | 11/1978 | Pennell | |
| 4,183,455 A | 1/1980 | Reynolds | |
| 4,264,070 A | 4/1981 | Torres | |
| 4,339,132 A | 7/1982 | Stevens et al. | |
| 4,376,417 A | 3/1983 | Blonski | |
| 4,420,158 A | 12/1983 | Klock et al. | |
| 4,493,344 A | 1/1985 | Mathison et al. | |
| 4,507,844 A | 4/1985 | Renaud | |
| 4,603,904 A | 8/1986 | Tolleson et al. | |
| 4,679,961 A * | 7/1987 | Stewart | 403/341 |
| 4,702,478 A | 10/1987 | Kruse | |
| 4,718,700 A | 1/1988 | Horch et al. | |
| 4,806,042 A | 2/1989 | Swank et al. | |
| 4,865,064 A | 9/1989 | Parsons et al. | |
| 4,875,794 A | 10/1989 | Kern, Jr. | |
| 4,921,257 A | 5/1990 | Heller | |
| 4,928,634 A | 5/1990 | Voigt | |
| 4,960,284 A | 10/1990 | Stude | |
| 4,979,531 A | 12/1990 | Toor et al. | |
| 5,048,844 A | 9/1991 | Haseltine | |
| 5,070,597 A | 12/1991 | Holt et al. | |
| 5,080,375 A | 1/1992 | Moosavi | |
| 5,088,675 A | 2/1992 | Perrault et al. | |
| 5,116,056 A | 5/1992 | Schmutte | |
| 5,178,583 A | 1/1993 | Rankin | |
| 5,186,469 A | 2/1993 | Terris | |
| 5,195,839 A | 3/1993 | Wicklund et al. | |
| 5,217,315 A | 6/1993 | Rosane | |
| 5,251,938 A | 10/1993 | Ericksen | |
| 5,289,792 A | 3/1994 | Forrest et al. | |
| 5,332,281 A | 7/1994 | Janotik et al. | |
| 5,333,434 A | 8/1994 | Oberman et al. | |
| 5,348,414 A | 9/1994 | Dziuk et al. | |
| 5,372,562 A | 12/1994 | Chang | |
| 5,413,340 A | 5/1995 | Potvin et al. | |
| 5,503,491 A * | 4/1996 | Lu | 403/86 |
| 5,539,957 A | 7/1996 | Schmidt | |
| 5,566,952 A | 10/1996 | Mullin et al. | |
| 5,577,799 A | 11/1996 | St. Germain | |
| 5,590,674 A | 1/1997 | Eppenbach | |
| 5,628,336 A | 5/1997 | Lee | |
| 5,649,866 A | 7/1997 | Balwanz | |
| 5,678,824 A | 10/1997 | Fortier et al. | |
| 5,681,231 A | 10/1997 | Reeves | |
| 5,681,238 A | 10/1997 | Minowa et al. | |
| 5,695,195 A | 12/1997 | John et al. | |
| 5,746,533 A | 5/1998 | Schmidt | |
| 5,830,089 A | 11/1998 | Halter et al. | |
| 5,839,733 A | 11/1998 | Meeks et al. | |
| 5,842,939 A | 12/1998 | Pui et al. | |
| 6,000,175 A | 12/1999 | Gale et al. | |
| 6,014,794 A | 1/2000 | Mc Coy | |
| 6,095,713 A * | 8/2000 | Doyle et al. | 403/97 |
| 6,142,698 A * | 11/2000 | Nutter | 403/109.1 |
| 6,164,504 A | 12/2000 | Richard | |
| 6,220,776 B1 | 4/2001 | Reeves | |
| 6,241,630 B1 | 6/2001 | Alberti | |
| 6,247,699 B1 | 6/2001 | Macaluso | |
| 6,292,987 B1 | 9/2001 | Combes | |
| 6,561,931 B1 | 5/2003 | Reeves | |
| 6,652,395 B2 | 11/2003 | Goldwitz | |
| 6,711,783 B2 | 3/2004 | LeMole | |
| 7,377,714 B2 | 5/2008 | Reeves | |
| 2010/0184538 A1 | 7/2010 | Reeves | |

* cited by examiner

COLLAPSIBLE STRUCTURES AND JOINTS FOR COLLAPSIBLE STRUCTURES

FIELD OF THE INVENTION

The present invention relates generally to collapsible structures and specifically to joints for collapsible structures and methods of collapsing and assembling structures.

BACKGROUND OF THE INVENTION

U.S. Pat. No. 5,681,231, which is incorporated herein by reference in its entirety, discloses a collapsible structure, in particular a game goal, with an elbow joint having an arm with a gap therein. A frame member inserts into the gap in a fixed or upright position and is removed from the gap to collapse the structure. A flexible member connected to the frame member and the portion of the elbow having the gap allows the frame member to move into and out of the joint while remaining connected to the overall structure.

U.S. Pat. No. 6,220,776, which is incorporated herein by reference in its entirety, discloses a corner or straight joint for a collapsible structure with a socket portion that accommodates a movable member with multiple degrees of motion. In this joint the movable member is connected with a threaded or otherwise twistable connection to the rod of a heim joint which rotates on a roll pin. The movable portion moves in and out of the socket portion to erect and collapse the structure, as frame members are attached to the fixed and movable portions of the joint.

U.S. Pat. No. 7,377,714, which is incorporated herein by reference in its entirety, discloses a mechanical joint formed from a hollow structure of material shaped to form a socket. The socket is configured to snap fit with a movable member. A flexible member is positioned in the socket and is attached to the movable member, and the flexible member can twist to permit the movable member to permit the movable member to be located in a variety of positions.

U.S. Patent Publication No. 2010/00184538, which is incorporated herein by reference in its entirety, discloses a game goal that collapses both vertically and laterally. The goal includes joints and brackets that facilitate the collapse of the goal such that during vertical collapse, the forward uprights of the goal fold below the goal's lower rear support member to enhance the ability to transport the goal.

BRIEF SUMMARY OF THE INVENTION

Collapsible structures, joints for collapsible structures and methods of collapsing and assembling structures are provided. Collapsible structures according to the present invention can be sporting goals for a variety of sports, including but not limited to soccer, futsal, hockey, street hockey, field hockey, and lacrosse. Collapsible structures according to the present invention can also be temporary or long-term housing structures, tents, scaffolding, or any other structure where a collapsible feature is desirable. A joint assembly according to the present invention can include a mating member, wherein the mating member includes a tip section having a first end and a second end. The joint assembly can also include a receiving member including a socket section defining a lumen. The socket section can have an internal surface and can include a longitudinal slot. The lumen can be configured to receive the tip section of the mating member through the longitudinal slot. The joint assembly can also include a flexible member coupled to the receiving member and to the first end of the mating member. The first end of the tip section has a non-circular cross-section that provides at least two points of contact with the internal surface of the socket section when the tip section is positioned within the lumen of the socket section.

The joint assembly can be configured to be movable from an assembled configuration to a collapsed configuration, wherein the joint assembly is in the assembled configuration when the tip section of the mating member is positioned in the lumen of the receiving member. The joint assembly is in the collapsed configuration when the tip section is withdrawn from the lumen of the receiving member. A slider can at least partially encompass the mating member.

Another joint assembly according to the present invention includes a mating member and a receiving member including a socket section. The socket section is formed in the shape of a hollow truncated cone such that the effective cross-sectional external diameter of the socket section generally decreases along the length of the mating member to define a slope. A slider can be provided, wherein the slider is configured to at least partially encompass the mating member. The slider includes an internal surface having a mating section, wherein the internal diameter of the slider in the mating section varies along a length of the mating section to define a slope such that the slope of the mating section of the slider substantially matches the slope of the socket section. A protrusion can extend from the internal surface of the slider. The internal surface of the slider can include a rear section, wherein the internal diameter of the slider in the rear section varies along a length of the rear section to define a slope. The joint assembly can assume a locked configuration when the slider is positioned over a longitudinal slot of the socket section and the mating section of the internal surface of the slider abuts an external surface of the socket section to provide a resistance or non-locking taper fit between slider and the socket section.

BRIEF DESCRIPTION OF THE FIGURES

Further features and advantages will become apparent from the following and more particular description of the present invention, as illustrated in the accompanying drawings, in which like referenced characters generally refer to the same parts or elements throughout the views.

DETAILED DESCRIPTION OF THE INVENTION

The following detailed description of collapsible structures and joints for collapsible structures refers to the accompanying figures that illustrate exemplary embodiments. Other embodiments are possible. Modifications can be made to the embodiments described herein without departing from the spirit and scope of the present invention. Therefore, the following detailed description is not meant to be limiting. Further, it would be apparent that the systems and methods described below can be implemented in many different embodiments of hardware. Any actual hardware described is not meant to be limiting. The operation and behavior of the apparatuses and methods presented are described with the understanding that modifications and variations of the embodiments are possible given the level of detail presented. For example, while the description provided is generally described in the context of collapsible sporting goals, the systems and methods described herein should not be limited to collapsible sporting goals. One of skill in the art would readily understand how to incorporate the features and structures described herein into other collapsible structure products. For example, the apparatuses and methods described herein can be used for a variety of collapsible structures, for example, temporary or long-term housing structures, tents, scaffolding, or any other structure where a collapsible feature is desirable.

Figure 1:
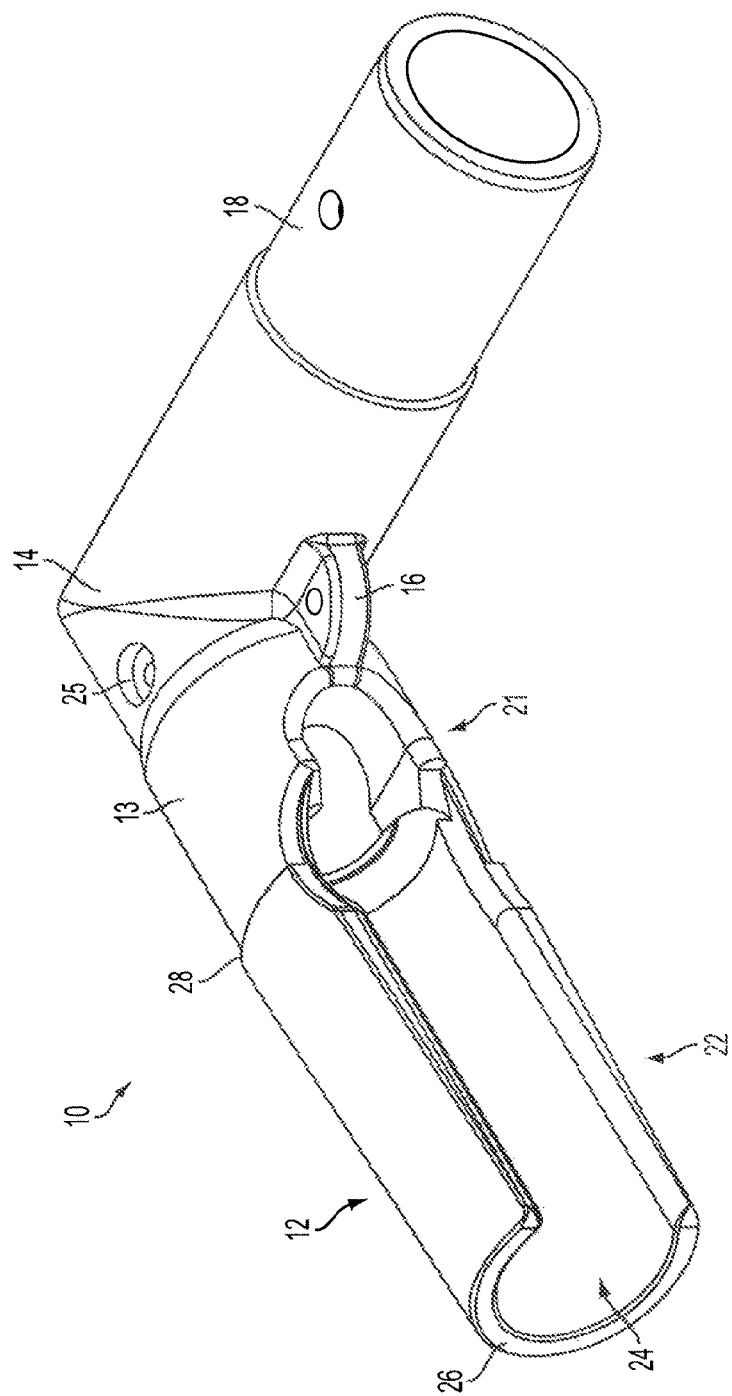
FIG. 1 is a perspective view of an angled receiving member for a collapsible joint according to an embodiment of the present invention.

FIG. 1 is a perspective view of an angled receiving member 10 for a collapsible joint according to an embodiment of the present invention. Receiving member 10 includes a pipe mount end 18 and a socket section 12. Socket section 12 includes a first end 26 and a second end 28. Socket section 12 further includes a relief area 13 and an angled portion 14. In the embodiment shown in FIG. 1, pipe mount end 18 is positioned at an angle to socket section 12. A fastening mount 16 is positioned on the interior side of angled portion 14 of receiving member 10. Fastening mount 16 can be used to secure netting or other materials to the receiving member 10. Although fastening mount 16 is shown in FIG. 1 on the interior of angled portion 14, it is understood that fastening mount 16 can be positioned at any location on the external surface of angled portion 14, or can be positioned at other positions on the external surface of receiving member 14. Fastening mount 16 can be formed with a hook or clasp instead of a circular hole.

Second end 28 of socket section 12 is positioned adjacent to relief area 13. Relief area 13 is adjacent to angled portion 14. A lumen 24 preferably extends for the length of socket section 12. As will be described in further detail with reference to the remaining figures, lumen 24 is sized and shaped so as to receive flexible connector 60 (see FIG. 6). A longitudinal slot 22 is formed in socket section 12. Longitudinal slot 22 permits flexible connector 60 to enter into and be removed from lumen 24. In a preferred embodiment, the width between the two sides of longitudinal slot 22 is less than the effective internal diameter of socket section 12. As will be explained in further detail herein, the relationship of slot width to internal diameter assists in securely connecting the components of joints according to the present invention.

Socket section 12 has an internal cross-sectional diameter and an external cross-sectional diameter. As seen in FIG. 1, socket section 12 section is formed generally in the shape of a hollow truncated cone. In other words, the effective cross-sectional external diameter of the socket section 12 generally decreases from the second end 28 to the first end 26 to define a longitudinal slope. The slope of socket section 12 is preferably between 0 and 10 degrees, and more preferably between 0 and 5 degrees. In a preferred embodiment, the slope of socket section 12 is approximately 2 degrees. A portion of socket section 12 has been removed to form longitudinal slot 22. It is understood that when socket section 12 is referred to as having the shape of a truncated cone, it is meant that if socket section 12 was extended to close longitudinal slot 22 to form a tubular shape the shape of socket section 12 would be a truncated cone. In other words, the description of socket section 12 having a truncated cone shape is meant merely to aid in understanding the slope of socket section 12. It is also understood that the external diameter of socket section 12 can be constant in embodiments of the present invention.

The effective cross-sectional internal diameter of socket section 12 is generally constant from second end 28 to first end 26. It is understood that the socket section 12 can also be formed with an effective cross-sectional internal diameter of socket section 12 that is non-constant to define an interior slope.

As further shown in FIG. 1, an opening 25 is formed in relief area 13. Opening 25 allows for insertion of a screw or other coupling device to secure one end of flexible connector 60 to the interior of the receiving member 10. Relief area 13 includes a relief slot 21 that is preferably an extension of longitudinal slot 22 of socket section 12. The function of relief slot 21 is described in further detail herein with reference to FIGS. 16-23.

As depicted in FIG. 1, the angled portion 14 of receiving member 10 is formed with an angle of approximately 90 degrees between pipe mount end 18 and socket section 12. However, it is understood that various other angles can be utilized in accordance with the present invention. For example, angled portion 14 can be formed such that the interior angle between pipe mount end 18 and socket section 12 is less than 90 degrees, for example, approximately 45 degrees. Alternately, angled portion can form an angle of greater than 90 degrees between the pipe mount end 18 and the socket section 12. Furthermore, as shown and described with reference to FIG. 2, receiving members according to the present invention can be formed without an angled portion 14 such that the angle between socket section 12 and pipe mount end 18 is approximately 180 degrees. Receiving member 10 can also be formed such that the angle between pipe mount end 18 and socket section 12 is greater than 180 degrees, for example 270 degrees. In embodiments where the angle is greater than 180 degrees, pipe mount end 18 generally extends from relief area 13 in a direction opposite to location of longitudinal slot 22. However, the rotational location of longitudinal slot 22 and relief slot 21 can be varied in accordance with the present invention. For example, although longitudinal slot 22 is open to the interior of angled receiving member 10 in the embodiment shown in FIG. 1, it is understood that longitudinal slot 22 and relief slot 21 can instead be opened to either side of the socket section 12 or to any other rotational position on socket section 12. As such, the angle between socket section 12 and pipe mount end 18 can be off-axis with longitudinal slot 22 and relief slot 21. For example, in the receiving member 10 shown in FIG. 1, longitudinal slot 22 can be formed at other rotational positions in the external surface of socket section 12. Longitudinal slot 22 can be rotated 90 degrees with respect to the position shown in FIG. 1 such that longitudinal slot 22 is positioned on the top or bottom of socket section 12 when socket section 12 is viewed in the orientation shown in FIG. 1.

Figure 2:
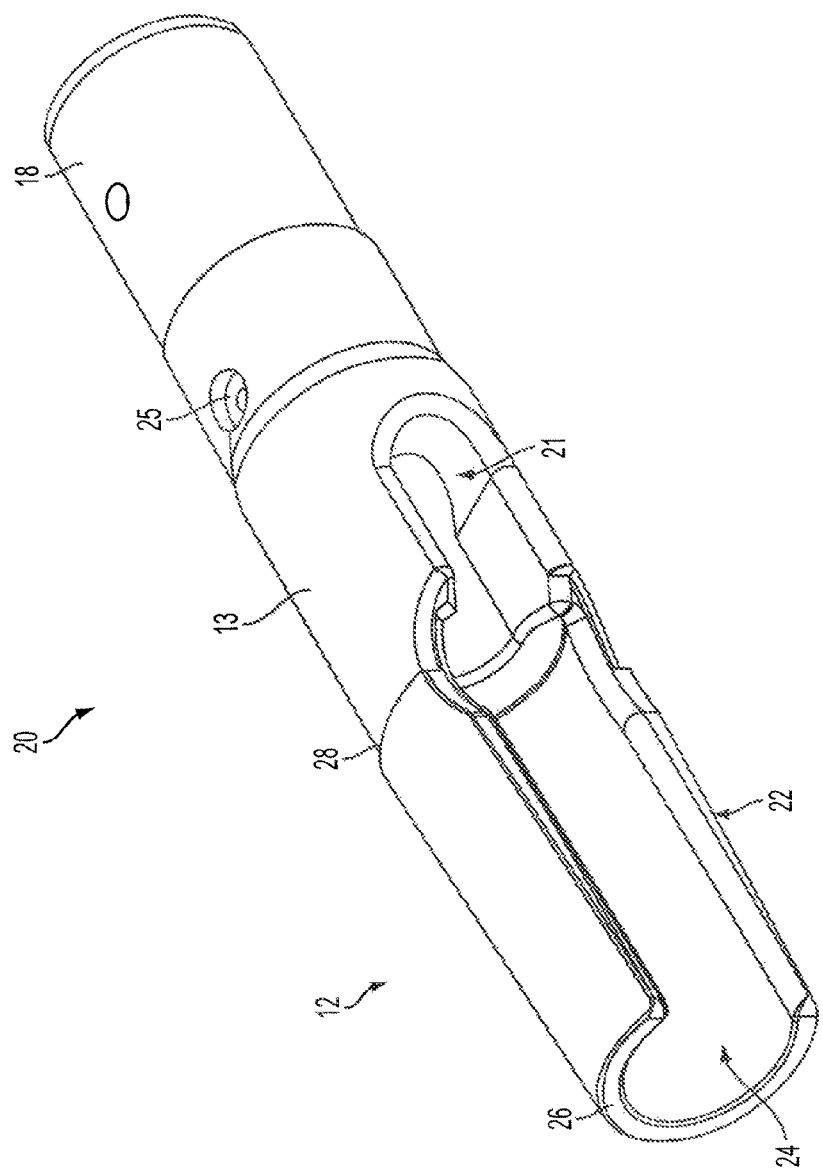
FIG. 2 is a perspective view of a straight receiving member for a collapsible joint according to another embodiment of the present invention.

FIG. 2 is a perspective view of a receiving member 20 for a collapsible joint according to another embodiment of the present invention. Receiving member 20 is similar to receiving member 10. However, receiving member 20 does not include angled portion 14, and therefore receiving member 20 is generally straight, or, in other words, the angle between pipe mount end 18 and socket section 12 is approximately 180 degrees. Socket section 12 includes a second end 28 and a first end 26. Socket section 12 further includes a relief area 13. Second end 28 is positioned adjacent to relief area 13. A lumen 24 preferably extends for the length of socket section 12. As will be described in further detail with reference to the remaining figures, lumen 24 is sized and shaped so as to receive at least a portion of flexible connector 60 (see FIG. 6). A longitudinal slot 22 is formed in socket section 12. Longitudinal slot 22 and relief slot 21 permit at least a portion of flexible connector 60 to enter into and be removed from lumen 24. In a preferred embodiment, the width between the two sides of longitudinal slot 22 is less than the effective internal diameter of socket section 12. Socket section 12 has an internal cross-sectional diameter and an external cross-sectional diameter. Socket section 12 section is formed generally in the shape of a hollow truncated cone. In other words, the cross-sectional external diameter of the socket section 12 generally decreases from the second end 28 to the first end 26 to define a longitudinal slope. The effective cross-sectional internal diameter of socket section 12 is generally constant from second end 28 to first end 26. As will be described in further detail herein, the longitudinal slope of socket section 12 aids in increasing the strength and stability of the assembled joint and thereby of the collapsible structure as a whole. It is understood that, in accordance with the present invention, the socket section 12 can also be formed with an effective cross-sectional internal diameter of socket section 12 that is non-constant to define an interior slope. As further shown in FIG. 1, an opening 25 is formed in relief area 13. Opening 25 allows for insertion of a screw or other coupling devices to secure one end of flexible connector 60 to the interior of the receiving member 10. Relief area 13 includes a relief slot 21 that is preferably an extension of longitudinal slot 22 of socket section 12. The function of relief slot 21 is described in further detail herein with reference to FIGS. 16-23.

Although receiving members 10 and 20 are depicted herein as having only one socket section 12, it is understood that receiving members 10 and 20 can be formed with two or more socket sections 12 coupled to a single pipe mount end 18. In addition, receiving members 10 and 20 can be formed with more than one pipe mount end 18 coupled to a single socket section 12. Receiving members 10 and 20 can also be formed with two or more socket sections 12 and two or more pipe mount ends 18. Receiving members with these features can be useful in a variety of sports goals and other structures. For example, receiving members with two or more socket sections 12 and a single pipe mount end 18 can be useful in sports goal frames such as those used for conventional street hockey or hockey where three members intersect at some corners. Receiving members and joints having such features are disclosed in U.S. Pat. No. 6,561,931 to Reeves, which is incorporated by reference herein in its entirety.

Figure 3:
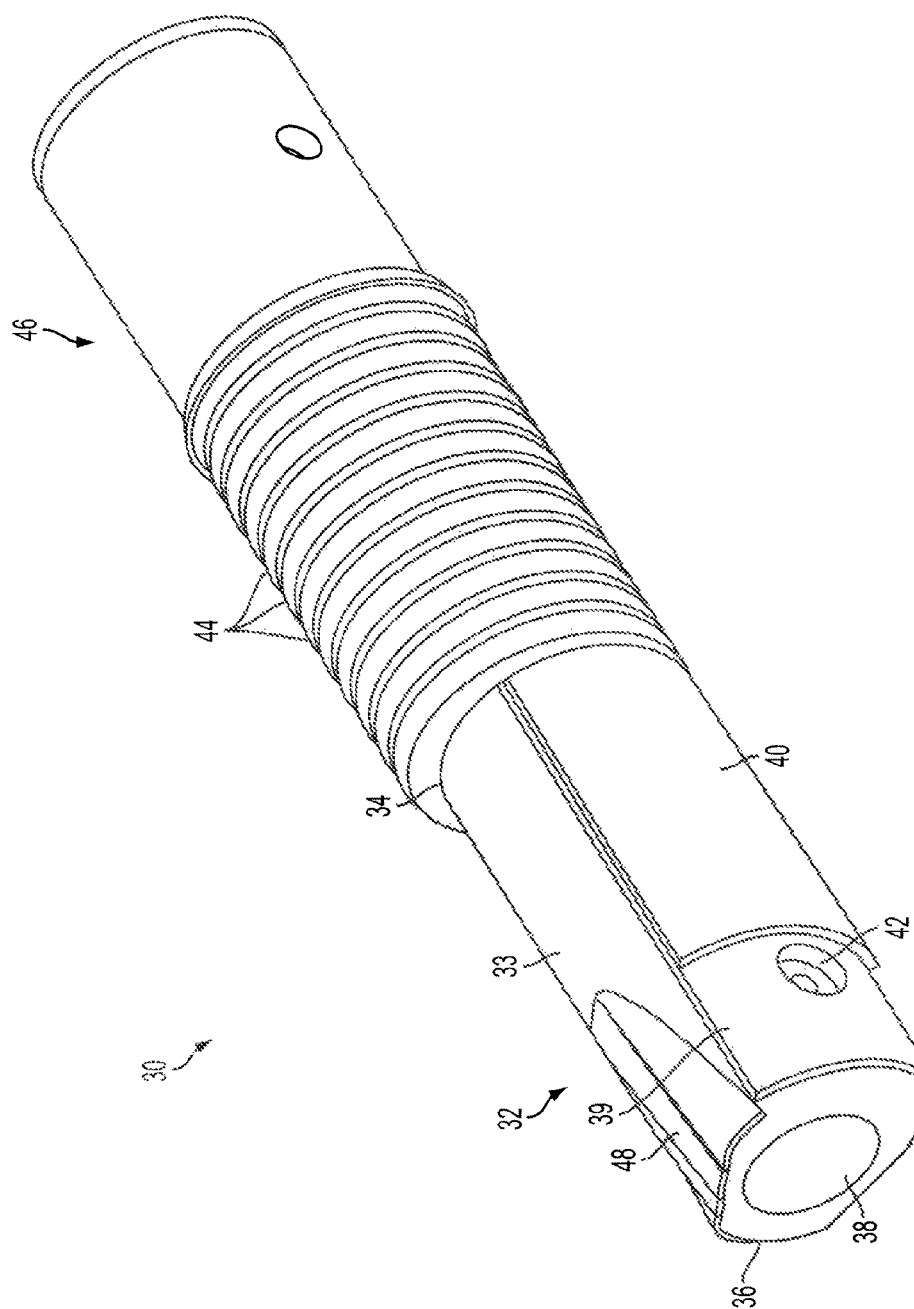
FIG. 3 is a perspective view of a mating member for a collapsible joint according to an embodiment of the present invention.
Figure 4:
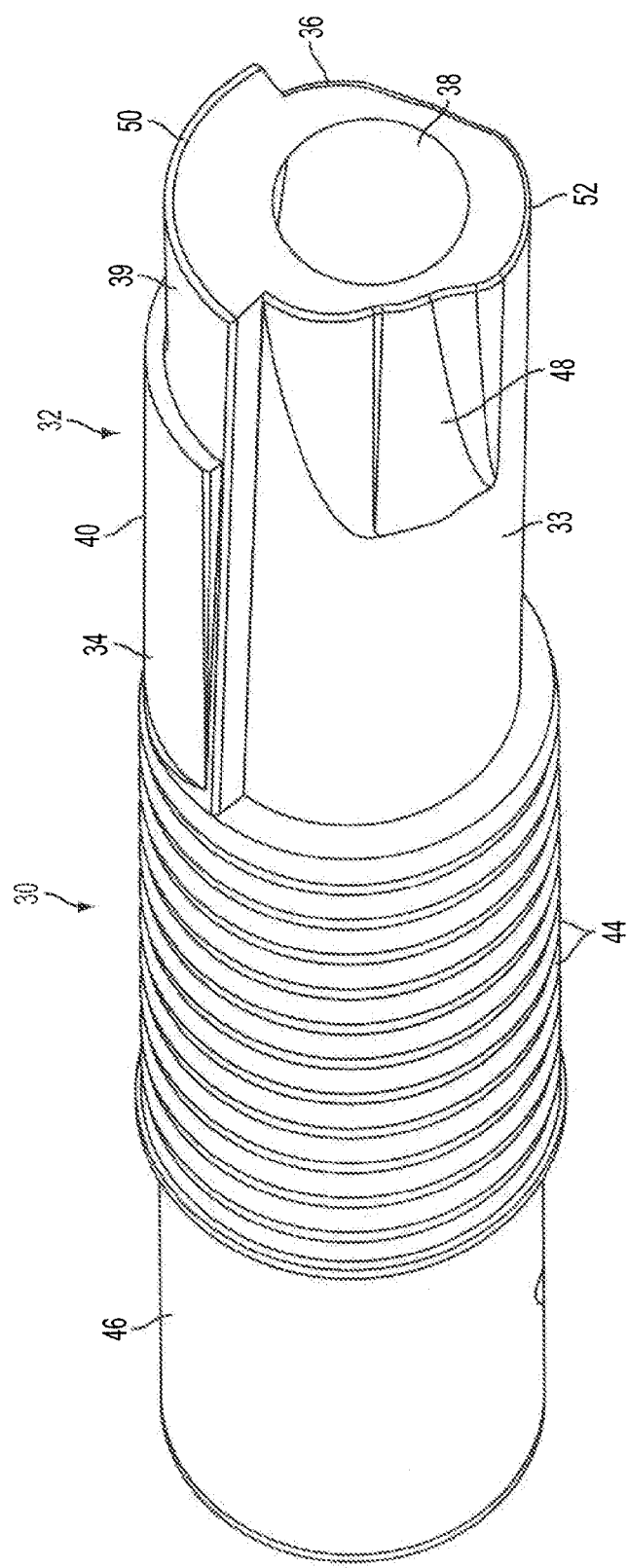
FIG. 4 is another perspective view of the mating member of FIG. 3.

FIGS. 3 and 4 depict a mating member 30 for a collapsible joint according to an embodiment of the present invention. Mating member 30 includes a pipe mount end 46 and a tip section 32. A plurality of ridges 44 are formed on the exterior surface of mating member 30. Although a plurality of ridges 44 are shown, it is understood that mating member 30 can include only one ridge 44 in embodiments of the present invention. It is further understood that ridges 44 can be formed in various shapes and sizes in accordance with the present invention. Ridges 44 can be formed such that they extend only partially around the circumference of mating member 30. The function of ridges 44 is described in further detail herein with respect to FIGS. 10-11.

Tip section 32 includes a first end 36 and a second end 34. In a preferred embodiment, the portion of tip section 32 adjacent to first end 36 is shaped so as to form a shaped end 48. The main body 33 of tip section 32 is formed generally in a truncated cone shape such that the external cross-sectional diameter of the main body 33 is generally constant along the length of tip section 32. A portion of tip section 32 is raised from main body 33 to form raised portion 39. A raised wedge 40 is provided along a section of raised portion 39. The height and effective external diameter of wedge 40 generally increases moving from the portion of wedge 40 adjacent to second end 34 towards the portion of wedge 40 adjacent to first end 36 to define a slope. The slope of wedge 40 is preferably between 0 and 10 degrees, and more preferably between 0 and 5 degrees. In a preferred embodiment, the slope of wedge 40 is approximately 2 degrees. An opening 42 allows for insertion of a screw or other coupling device to secure one end of flexible connector 60 to the interior of the mating member 30. A lumen 38 is formed in the mating member 30 to receiving a portion of flexible connector 60.

Figure 5:
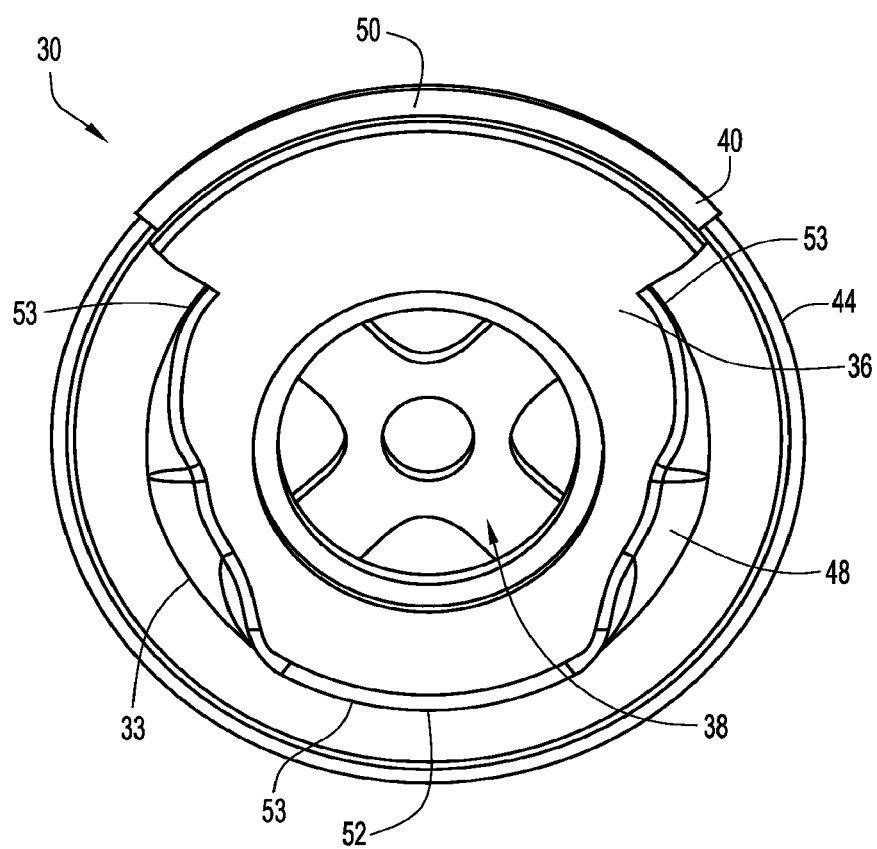
FIG. 5 is a longitudinal or head-on perspective view of one end of the mating member of FIG. 3.

As best seen in FIGS. 4 and 5, shaped end 48 is shaped such that the cross-sectional width of the first end 36 generally increases from the bottom 52 of shaped end 48 to the top 50 of shaped end 48. As will be explained in further detail herein, mating member 30 is inserted through longitudinal slot 22 and into lumen 24 of receiving member 10 or 20 in order to form an assembled joint according to the present invention. Because the interior of socket section 12 is generally circular in cross-section, the shape of shaped end 48 provides three points of contact 53 with the interior surface of socket section 12. In addition, because the bottom 52 of shaped end 48 has a reduced width, inserting the shaped end 48 through the longitudinal slot 22 of a receiving member is simplified, as the reduced width of the shaped end 48 effectively requires less flexing of the longitudinal slot 22, and therefore requires less force to be applied to the mating member 30, when moving the mating member 30 through the longitudinal slot 22.

Receiving members 10 and 20, mating member 30, and slider 70 are preferably formed from a synthetic polymer such as a polyamide. More preferably, receiving members 10 and 20, mating member 30, and slider 70 are formed of a semicrystalline polyamide such as polycaprolactam. The synthetic polymer used to form the joint components can be supplemented with a fiberglass reinforcement to add strength. The joint components can also be formed of other nylons, as well as acrylonitrile butadiene styrene (ABS), polypropylene, or polycarbonate materials. A combination of ABS and polycarbonate material can be used. Rubber or other elastomer materials can also be used.

Figure 6:
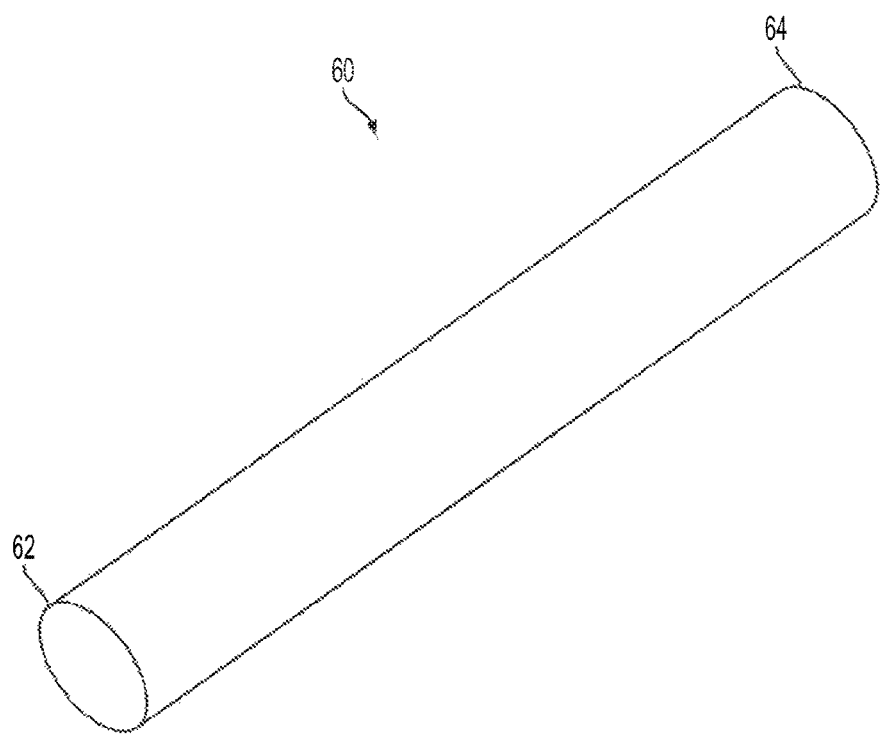
FIG. 6 is a perspective view of a flexible connector for a collapsible joint according to an embodiment of the present invention.

FIG. 6 is a perspective view of a flexible connector 60 for a collapsible joint according to an embodiment of the present invention. Flexible connector 60 is a cylindrical member and includes a first end 62 and a second end 64. Flexible connector 60 is preferably formed from a rubber or other elastomer material. However, it is understood that flexible connector 60 can be formed from other materials, such as soft plastics, cord, wire, or rope. However, rubber is preferred for its elastic resiliency and deformability.

Figure 7:
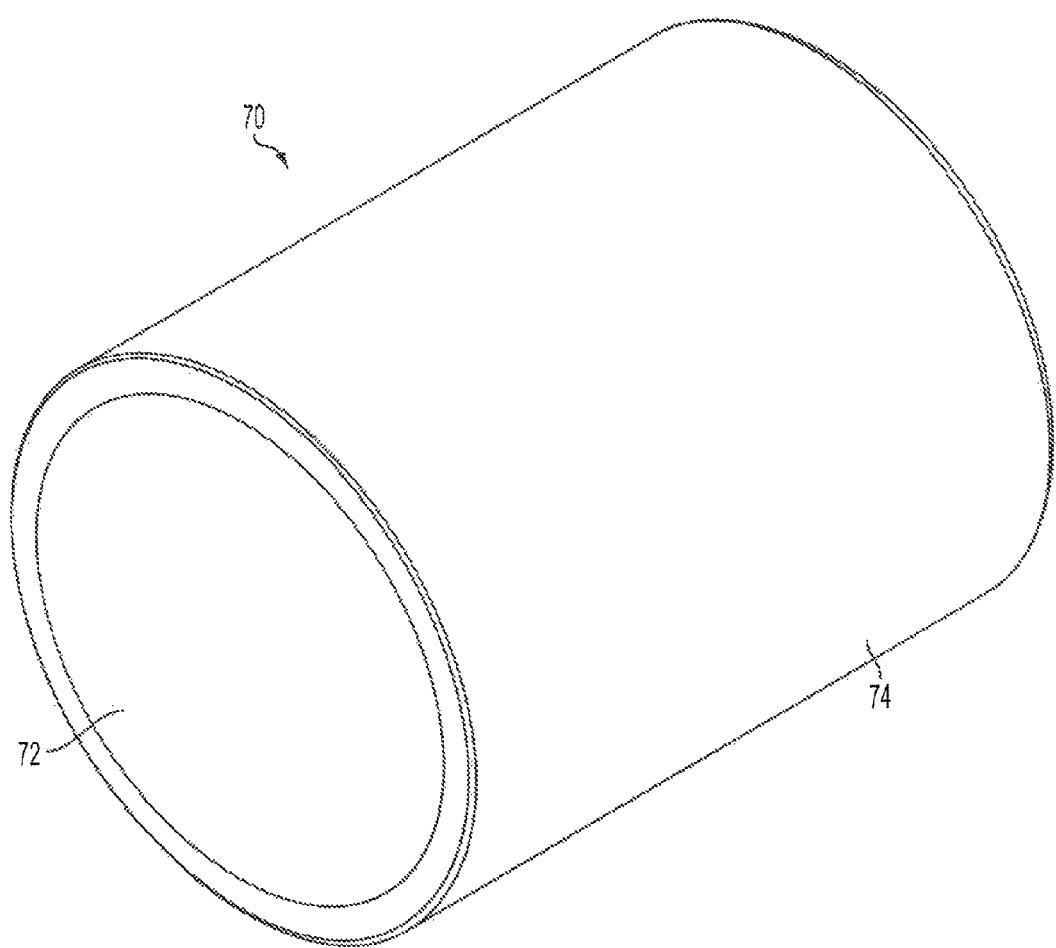
FIG. 7 is a perspective view of a slider for a collapsible joint according to an embodiment of the present invention.
Figure 9:
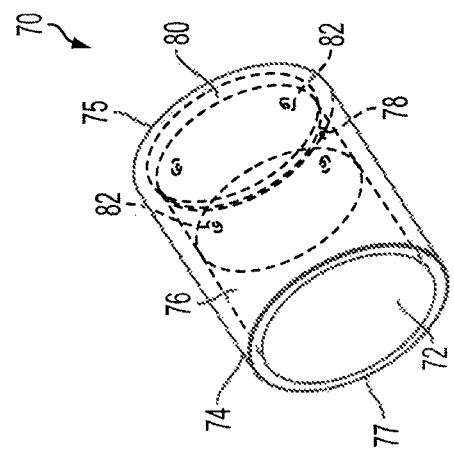
FIG. 9 is a transparent isometric view of the slider depicting the interior surface of the slider.
Figure 8:
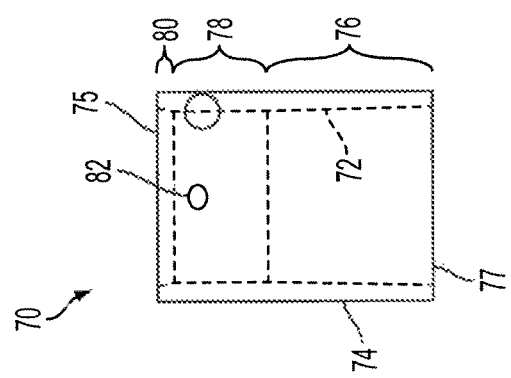
FIG. 8 is a transparent side view of the slider of FIG. 7 depicting the interior surface of the slider.

FIG. 7 is a perspective view of a slider 70 for a collapsible joint according to an embodiment of the present invention. Slider 70 is generally tubular in shape and includes an interior surface 72 and an exterior surface 74. Slider 70 defines an external diameter defined by the distance between opposite points on the exterior surface 74. Slider 70 also defines an interior diameter defined by the distance between opposite points on the interior surface 72. As seen in FIGS. 8 and 9, the interior diameter of slider 70 varies along the length of slider 70. Preferably, the slider has three distinct sections defined by the slope of the interior surface 72 in that section. A cylindrical section 78 of interior surface 72 is the middle of the three sections. The interior diameter of slider 70 does not vary along cylindrical section 78. In the cylindrical section 78, one or more protrusions 82 are formed on the interior surface 72 of slider 70. In a preferred embodiment, four protrusions 82 are provided in cylindrical section 78. A rear section 80 of slider 70 has an interior diameter that gradually increases moving from cylindrical section 78 towards rear edge 75 of slider 70. A front section 76 extends from the cylindrical section 78 to the front edge 77 of slider 70. The interior diameter of front section 76 gradually increases moving from the cylindrical section 78 towards the front edge 77.

It is understood that the slopes of the different sections of slider 70 can be varied from those shown in FIGS. 8 and 9. For example, cylindrical section 78 can have a diameter that varies along its length in some embodiments of the present invention. Front section 76 and rear section 80 can have angles greater or less than those depicted in the figures. It is also understood that more or less than four protrusions 82 can be provided in cylindrical section 78. Instead of or in addition to protrusions 82, ridges can be formed on the inside of slider 70. The ridges can extend partially or all the way around the interior surface of cylindrical section 78.

Figure 12:
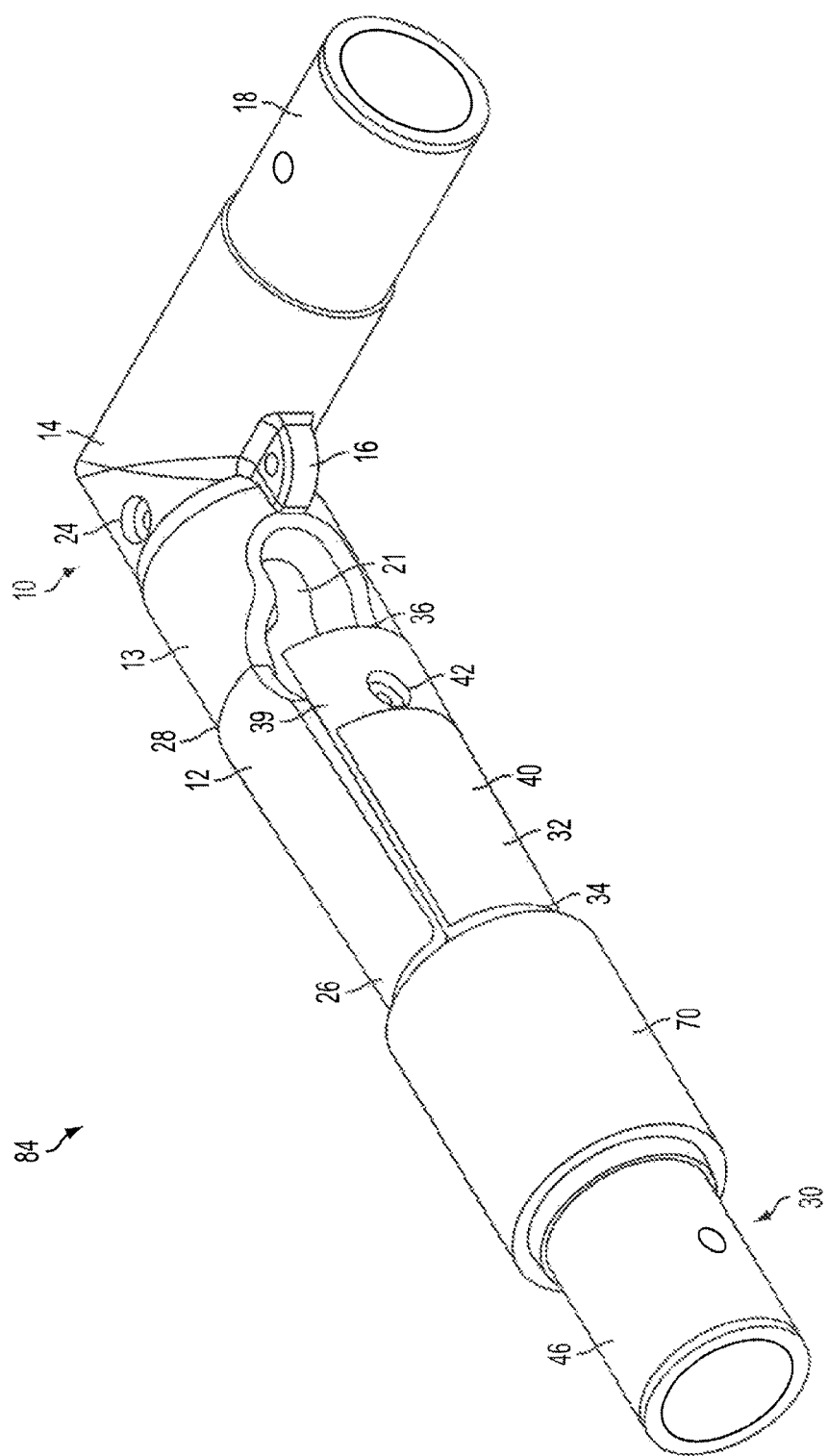
FIG. 12 is a perspective view of an assembled elbow joint according to an embodiment of the present invention in an unlocked configuration.
Figure 13:
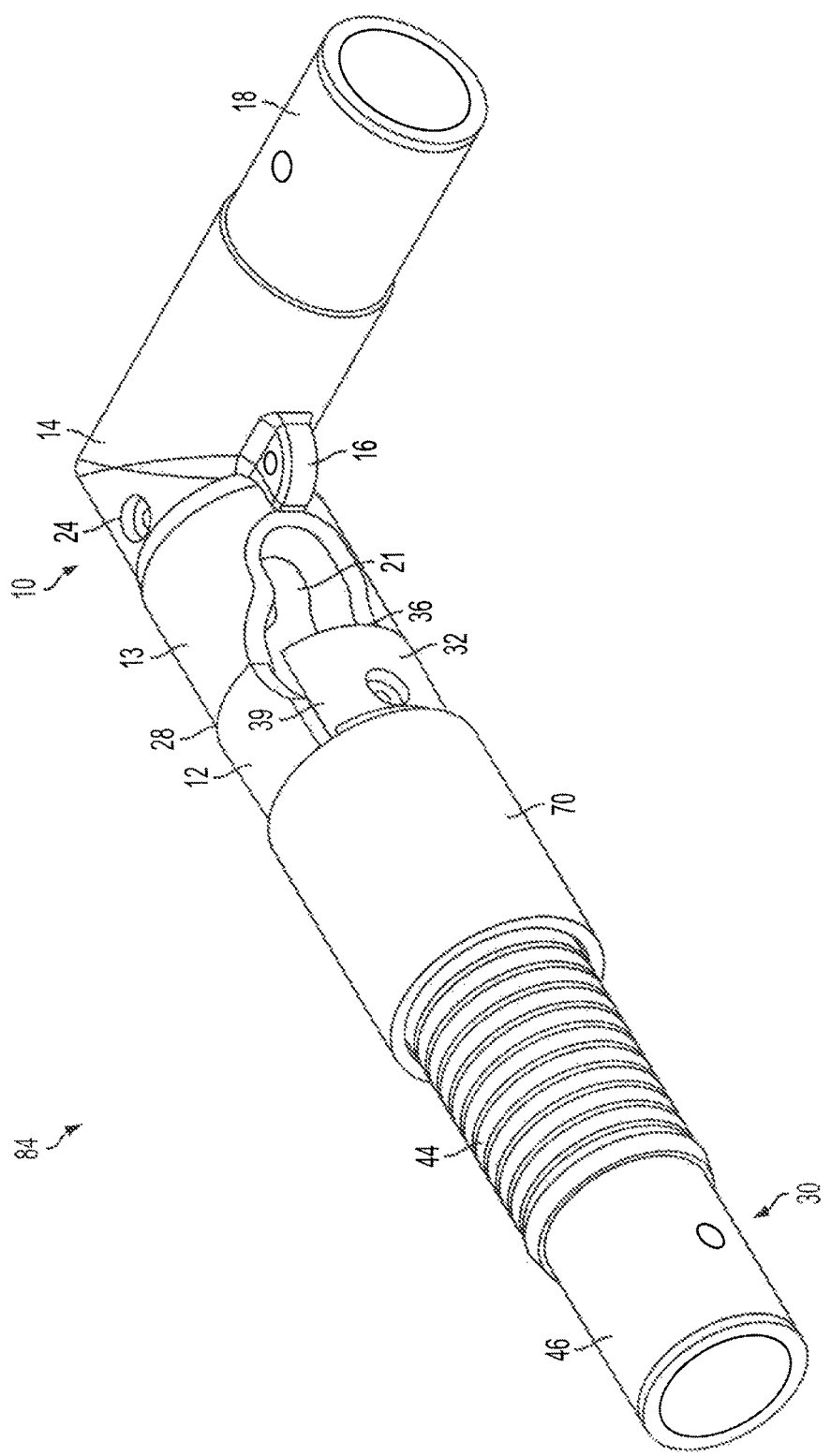
FIG. 13 is a perspective view of an assembled elbow joint according to an embodiment of the present invention in a locked configuration.
Figure 14:
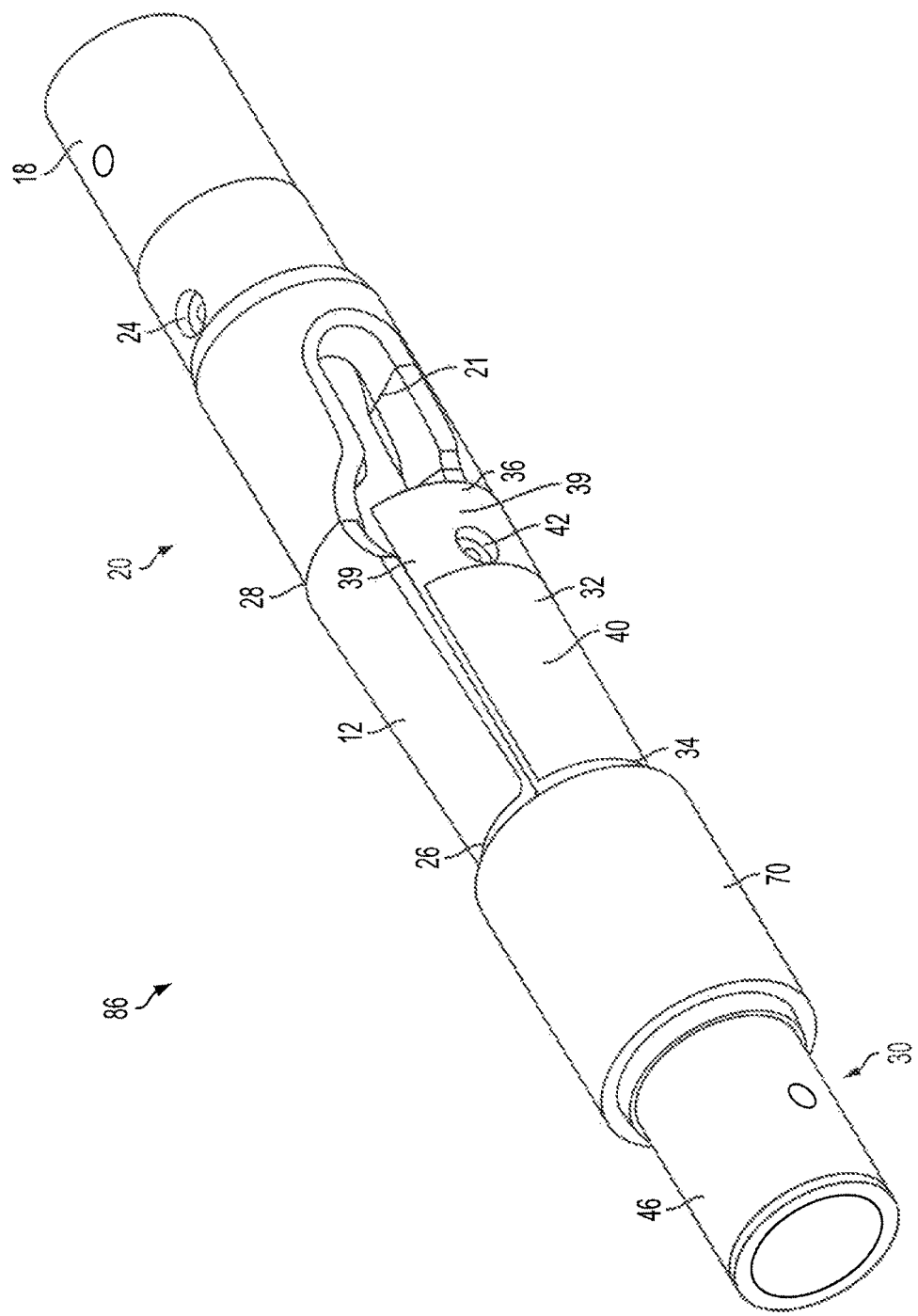
FIG. 14 is a perspective view of an assembled straight joint according to an embodiment of the present invention in an unlocked configuration.
Figure 15:
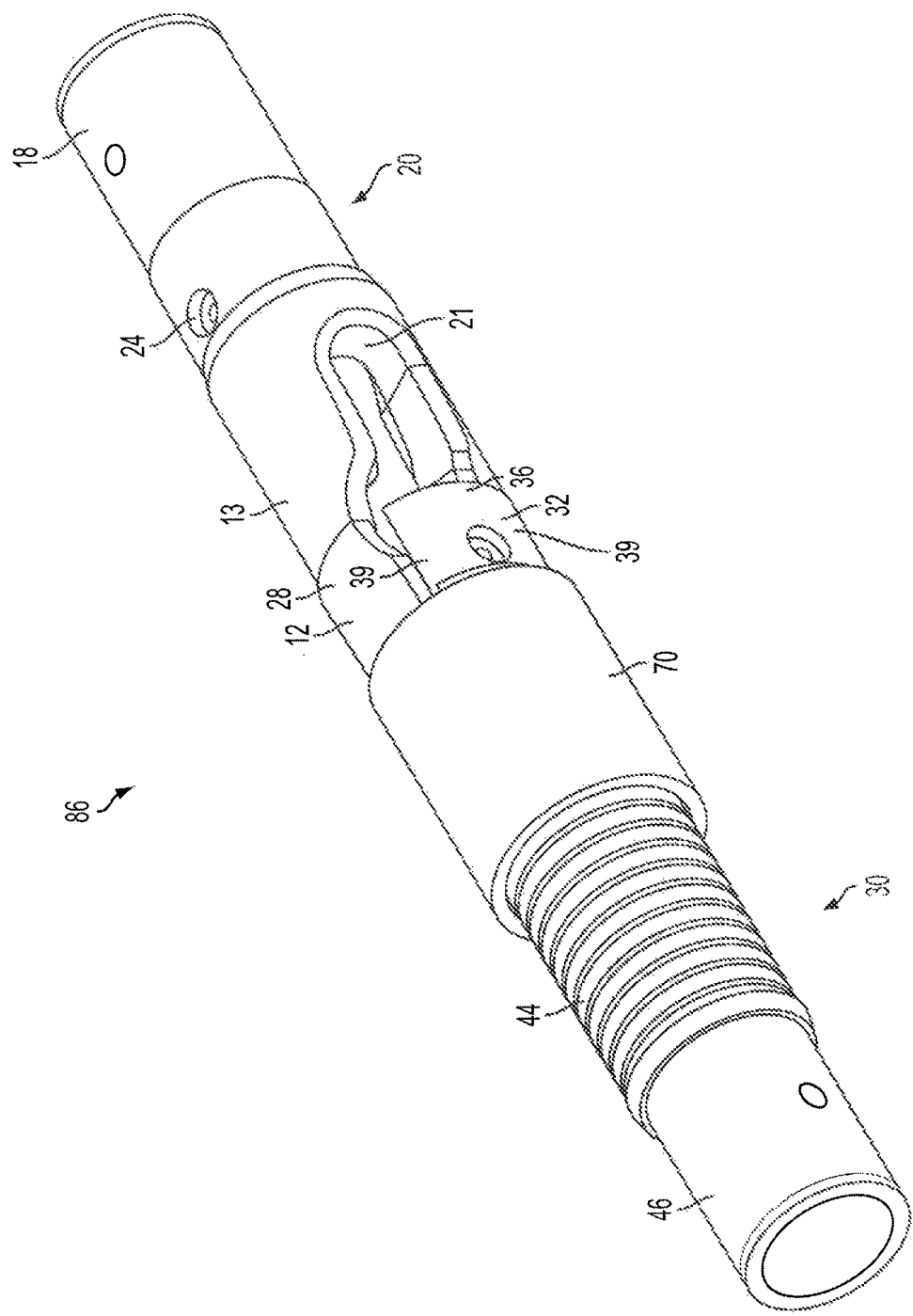
FIG. 15 is a perspective view of an assembled straight joint according to an embodiment of the present invention in a locked configuration.

FIGS. 12-15 illustrate assembled joints according to embodiments of the present invention. FIGS. 12 and 13 depict angled joints 84, and FIGS. 14 and 15 depict straight joints 86. In each of FIGS. 12-15, the tip section 32 of mating member 30 has been inserted into lumen 24 of socket section 12. Although not depicted in the figures, when angled joint 84 is in its assembled configuration a flexible connector 60 is coupled at a first end 62 to the first end 36 of tip section 32 and at a second end 64 to the interior of receiving member 10 or 20, depending on the selected receiving member, at the position of opening 25.

Joints 84 and 86 have several features that assist in providing a secure and stable fit between the receiving members 10 and 20 and the mating member 30. For example, longitudinal slot 22, socket section 12 of the receiving members 10 and 20, and the tip section 32 of the mating member 30 are sized and shape so as to provide a snap fit and resistance or non-locking taper fit between socket section 12 and tip section 32. First, the width of longitudinal slot 22 is at least slightly less than the interior diameter of socket section 12. The width of longitudinal slot 22 is also at least slightly less than the maximum internal diameter of the main body 33 of tip section 32. Upon insertion of tip section 32 through the longitudinal slot 22, the socket section 12 flexes and temporarily deforms to allow the larger diameter main body 33 to pass through longitudinal slot 22. As a result, the width of longitudinal slot 22 is resiliently increased to allow the main body of tip section 32 to enter lumen 24. After a certain point of insertion, the maximum diameter of main body 33 passes through the longitudinal slot 22, and the longitudinal slot 22 returns to its static position due to the inherent shape memory properties of the plastic material from which the socket section 12 is formed. Although a plastic material is preferred for its resiliency and resistance to fatigue, it is understood that other materials can be used to form socket section 12. For example, a metal can be used to form socket section 12. However, metal generally exhibits less resiliency and is more susceptible to material fatigue, which may reduce the effective life of the joint.

Once main body 33 of tip section 32 is fully within lumen 24 and longitudinal slot 22 has returned to its static position such that the width of longitudinal slot 22 is less than the external cross sectional diameter of main body 33, main body 33 is retained within lumen 22 by socket section 12. The width of longitudinal slot 22 prevents main body 33 from being removed from lumen 22 until sufficient force is applied to deform socket section 12 and thereby increase the width of longitudinal slot 22.

Once main body 33 is fully positioned in lumen 24 of socket section 12, the slope and effective external diameter of wedge 40 generally matches the slope and effective external diameter of socket section 12. As used herein, the term effective diameter refers to the diameter a part would have if that part were extended to form a closed cylinder. As a result, the assembled joint 84 has a generally circular cross-section at any given location in the area where the wedge 40 is positioned in the assembled joint 84. Furthermore, with reference to FIGS. 8 and 9, the slope of the interior surface 72 of the front section 76 of slider 70 substantially matches the slope of wedge 40 and socket section 12 such that moving slider over wedge 40 and socket section 12 results in a resistance or non-locking taper fit between the front section 76 of slider 70, wedge 40, and socket section 12. This resistance or non-locking taper fit aids in holding the slider 70 in position around tip section 32 and socket section 12.

In FIG. 12, angled joint 84 is depicted is in an assembled but unlocked configuration. Main body 33 of tip section 32 is positioned within lumen 24 of socket section 12. Slider 70 is positioned on the mating member 30 but does not cover any portion of socket section 12. Although the configuration shown in FIG. 12 is described as an unlocked configuration, it is understood that the geometrical relationship between main body 33 and socket section 12 serves to secure main body 33 within lumen 24. As such, joints 84 and 86 can be provided without slider 40 in some embodiments. However, slider 70 provides a further locking mechanism that supplements the resilient deformation of socket section 12. It is further understood that joints 84 and 86 can be provided without wedge 40.

Figure 10:
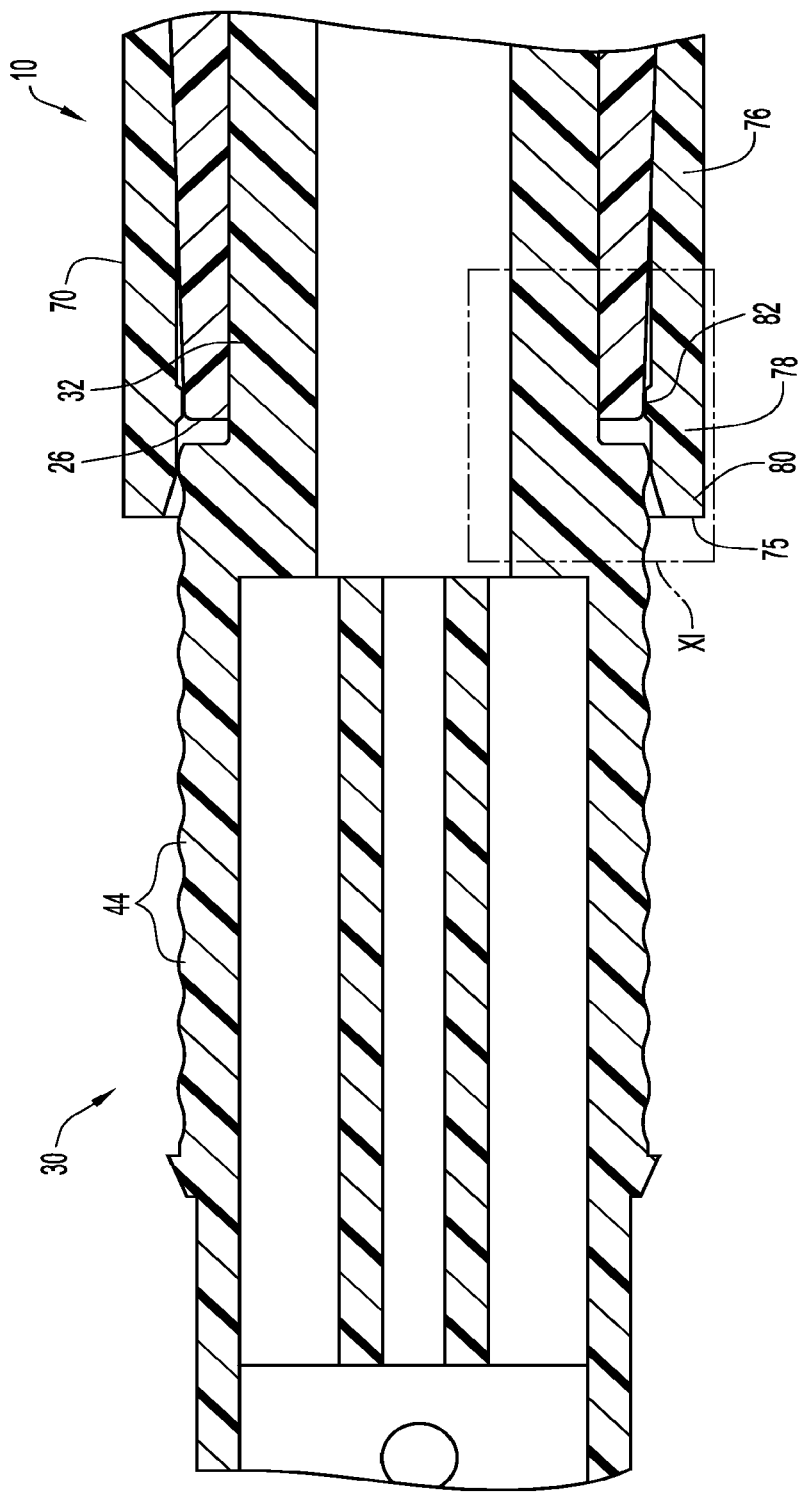
FIG. 10 is a cross-sectional view of a portion of an assembled joint according to an embodiment of the present invention in a locked configuration.
Figure 11:
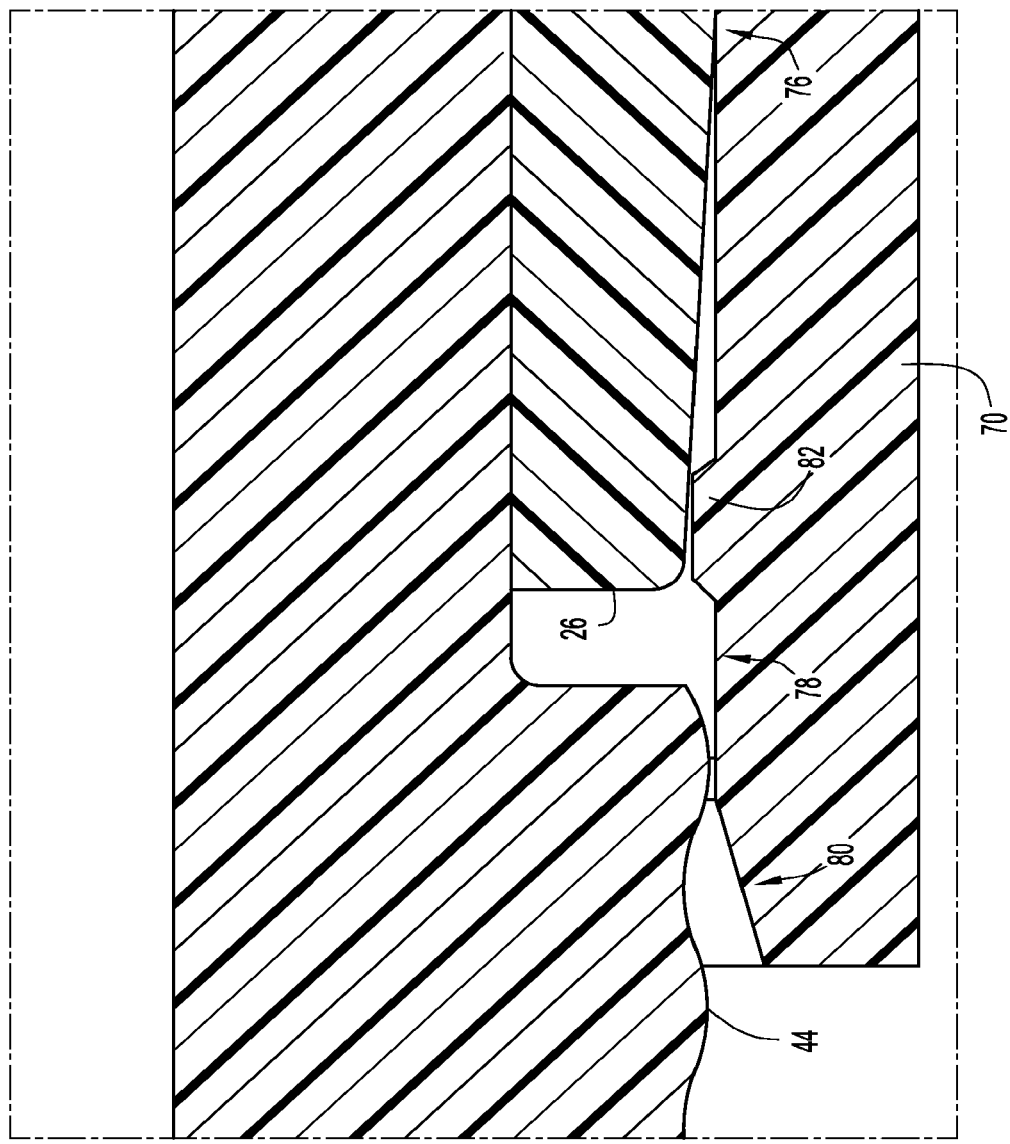
FIG. 11 is a close-up of a portion of the cross-sectional view of FIG. 10.

To move joint 84 to its locked configuration, shown in FIG. 13, slider 70 is forced over the first end 26 of socket section 12 and over wedge 40 until the interior surface 72 of front section 76 of slider 70 contacts the exterior surfaces of wedge 40 and socket section 12 to form a resistance or non-locking taper fit between slider 70 and the assembled joint. The interaction between slider 70, socket section 12, and mating member 30 is shown in FIGS. 10 and 11. When joint 84 is in its locked configuration, the interior surface 72 of front section 76 of slider 70 is in contact with the exterior surfaces of wedge 40 and socket section 12, which have slopes that generally match the slope of front section 76. A protrusion 82 is formed on the cylindrical section 78 of slider 70. When joint 84 is in its fully locked configuration, protrusion 82 is positioned over the first end 26 of socket section 12, but does not contact socket section 12 due to the varying internal diameter of slider 70. Specifically, because front section 76 of slider 70 forms a resistance or non-locking taper fit with socket section 12 and wedge 40, and because cylindrical section 78 of slider 70 is non-sloped, protrusion 82 is held off the surfaces of socket section 12 and wedge 40. When the joint 84 is in its locked position, rear section 80 of slider 70 is positioned partially over ridges 44, but is raised off of the surface of ridges 44 so as not to contact the ridges 44. It is understood that several protrusions 82 can be provided on the interior surface 72 of slider 70, and that one or more of the protrusions can be positioned over wedge 40 when joint 84 is in its locked configuration.

Ridges 44 provide a further backup system to hold slider 70 in place over socket section 12. If, for example, a collapsible structure featuring joint 84 is impacted, bumped, or otherwise disturbed, and the disturbance is sufficient to overcome the resistance or non-locking taper fit of slider 70 over socket section 12 and wedge 40, protrusions 82 on the interior surface 72 of slider 70 will come into contact with ridges 44, thereby preventing or resisting movement of slider 70 towards the pipe mount end 46 of mating member 30. Thus, even if the resistance or non-locking taper fit is disrupted, the slider will remain at least partially over the first end 26 of socket section 12 and over at least partially over wedge 40 such that tip section 32 of mating member 30 remains secured within lumen 24.

To move joint 84 from its locked configuration to its open configuration, slider 70 is moved toward pipe mount end 46 of mating member 30 with enough force to overcome the resistance caused by the interaction of protrusions 82 and ridges 44. Front section 76 of slider 70 is sloped away from front edge 77 to prevent front edge 77 from catching on ridges 44 as the slider moves toward pipe mount end 46. Although the interaction of protrusions 82 and ridges 44 resists movement of slider 70 towards pipe mount end 46, the resistance can be overcome by applying sufficient force to the slider 70 in the direction of pipe mount end 46.

FIGS. 14 and 15 are views of a straight joint 86 in an assembled but unlocked configuration (FIG. 14) and an assembled and locked configuration (FIG. 15). The joint is placed in its locked configuration in generally the same manner as that described above with respect to angled joint 84.

Although not depicted in FIGS. 12-15, flexible connector 60 is coupled at its first end 62 to first end 36 of tip section 32. The second end 64 of flexible connector 60 is coupled to the interior of receiving member 10 (or 20) at a longitudinal position proximate to opening 25. Preferably, flexible connector 60 is coupled to tip section 32 by inserting a screw through opening 42 and into flexible connector 60. Flexible connector 60 is coupled to receiving member 10 and receiving member 20 by inserting a screw through opening 25 and into flexible connector 60.

In addition to the coupling force provided by the screws, the steady state external diameter of flexible connector 60 is preferably slightly larger than the interior diameters of tip section 32 and receiving member 10 at the points where the flexible connector 60 is coupled to those structures. As noted above, flexible connector 60 is preferably formed of a rubber or other resiliently deformable material. Ends 62 and 64 of flexible connector 60 will thus compress as they are forced into the smaller diameter areas of tip section 32 and receiving member 10, respectively. A resistance or non-locking taper fit is thereby formed between end 62 and tip section 32 and between ends 64 and receiving member 10, supplementing the coupling force provided by the screws inserted through openings 24 and 42. It is understood that other coupling methods, for example, pins or bolts, swagging, heat seal, or friction can be used instead of or in addition to screws. The ends of flexible connector can also be glued to the interior surfaces of tip section 32 and receiving member 10. Plastic or metal sleeves can also be provided on the ends 62 and 64 of flexible connector 60 to assist in securing the flexible connector to the receiving member 10 and tip section 32.

To collapse joints 84 and 86, the joints are first manipulated into their assembled but unlocked configuration, shown in FIGS. 12 and 14 respectively. The sliders 70 of joints 84 and 86 are moved with sufficient force to overcome the resistance and non-locking taper fit between slider 70 and socket section 12 and to overcome the resistance generated by protrusions 82 impinging upon ridges 44. A user then applies force to the pipe mount end 46 of mating member 30, or to a pipe or post connected to pipe mount end 46, to move the second end 34 of tip section 32 through longitudinal slot 22 and out of lumen 24. The remainder of tip section 32 can then be moved through longitudinal slot and out of lumen 24. After tip section 32 is fully removed from lumen 24, the receiving member and mating member remain connected via flexible connector 60. However, because of the flexibility of flexible connector 60, joints 84 and 86 can be collapsed as shown in FIGS. 17-23. Angled joint 84 can be collapsed such that mating member 30 is adjacent to pipe mount end 18 of receiving member 10, as shown in FIG. 18 with respect to joints 100 and 102. Preferably, mating member 30 is substantially parallel to pipe mount end 18 when angled joint 84 is fully collapsed. Straight joint 86 can be collapsed such that mating member 30 is adjacent to pipe mount end 18 of receiving member 10, as shown in FIG. 23 with respect to joints 112 and 114. Preferably, mating member 30 is substantially parallel to pipe mount end 18 when angled joint 84 is fully collapsed.

Although flexible connectors 60 are not depicted in FIGS. 17-23, joints according to embodiments of the present invention contain a flexible connector 60 that extends from receiving members 10 and 20 to mating member 30. When angled joint 84 is in its collapsed configuration, flexible connector 60 extends through relief area 13 and has a bend of approximately 90 degrees between first end 62 and second end 64. When straight joint 86 is in its collapsed configuration, flexible connector 60 extends through relief area 13 and has a bend of approximately 180 degrees between first end 62 and second end 64. Although in preferred embodiments mating members 30 are fully collapsed against pipe mount ends 18 for storage of the collapsible structure (see FIG. 23), it is understood that mating members 30 can be stored in any position relative to pipe mount ends 18. Mating member 30 can also be twisted such that the mating member 30 is adjacent, and preferably substantially parallel, to the side of pipe mount end 18. That is, in its collapsed state, mating member 30 need not be aligned with longitudinal slot 22 of receiving member 10 or 20 and can be both twisted and angled to achieve a variety of compact collapsed positions. When mating member 30 is in the collapsed position it can be moved to any location outside longitudinal slot 22, including up and down, side to side and rotationally twisted as allowed by the rotating and or flexing of the flexible connector.

Figure 16:
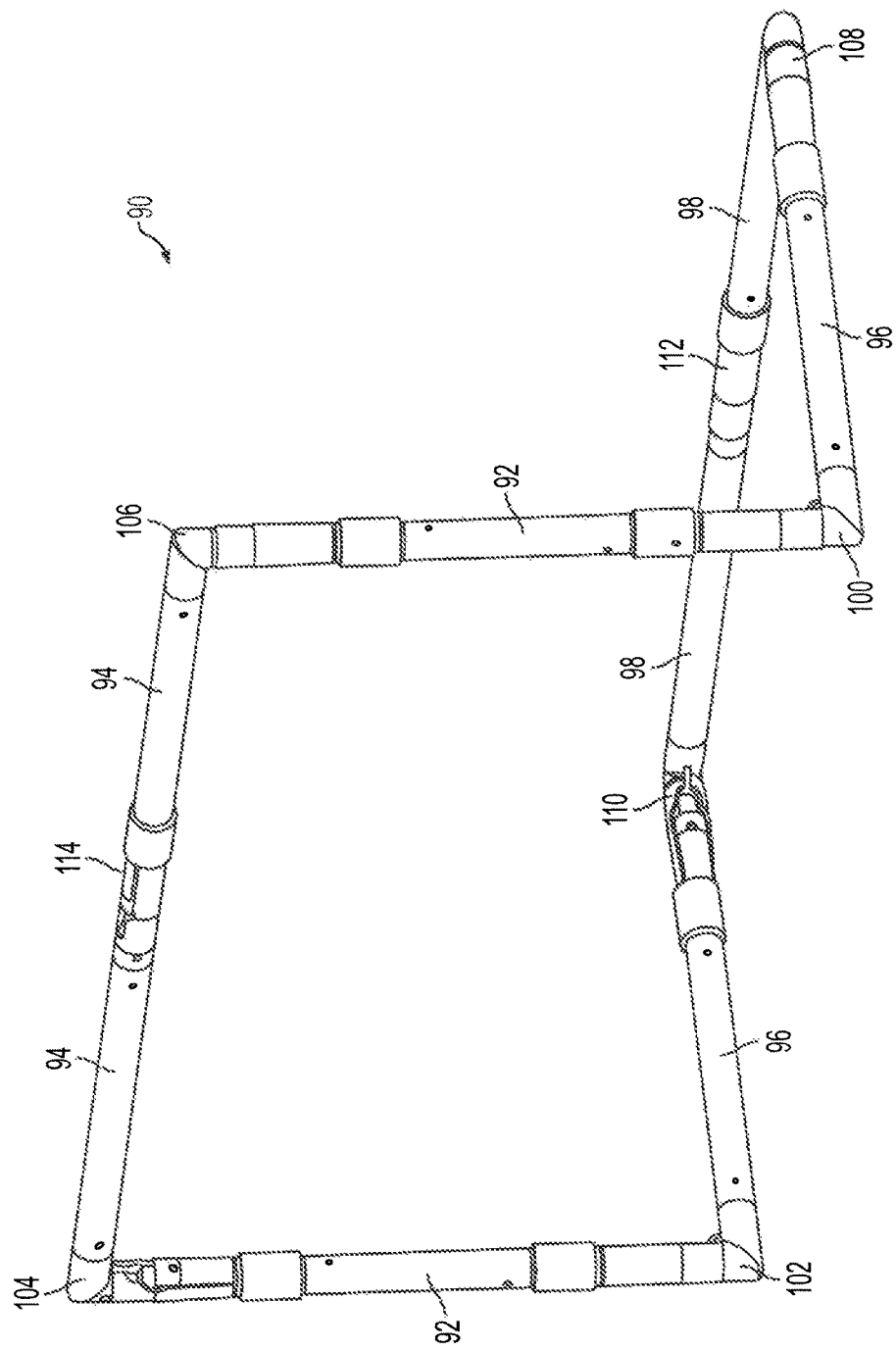
FIG. 16 is a perspective view of a collapsible sports goal according to an embodiment of the present invention in a fully assembled configuration.

FIG. 16 depicts a collapsible sports goal 90 according to an embodiment of the present invention. Sports goal 90 is one of a variety of possible structures that can utilize the joints described herein. Sports goal 90 includes angled joints 100, 102, 104, 106, 108, and 110 and straight joints 112 and 114. Sports goal 90 further includes two up tubes 92, two crossbar tubes 94, two ground tubes 96, and two rear tubes 98. Each tube 92, 94, 96, and 98 is coupled to a pipe mount end 18 or 46 at each end, depending on whether the joint is a straight joint or an angled joint. As depicted in FIG. 16, sports goal 90 is in its fully assembled configuration, and each joint in the goal is in its assembled but unlocked configuration with a slider 70 positioned over a socket section 12 and a wedge 40 of a tip section. Sports goal 90 can be used for a variety of sports, such as soccer, hockey, street hockey, futsal, etc. Sports goal 90 can be provided in a variety of dimensions as appropriate for a particular sporting application. Sports goal 90 can also be formed in shapes other than that shown in FIG. 16. For example, sports goals according to the present invention can be formed in the shape of a regulation lacrosse goal, a regulation hockey goal, or any other shape as desired. The joints and structures described herein can also be used for other collapsible structures, for example, temporary or long-term housing structures, tents, scaffolding, or any other structure where a collapsible feature is desirable.

Figure 17:
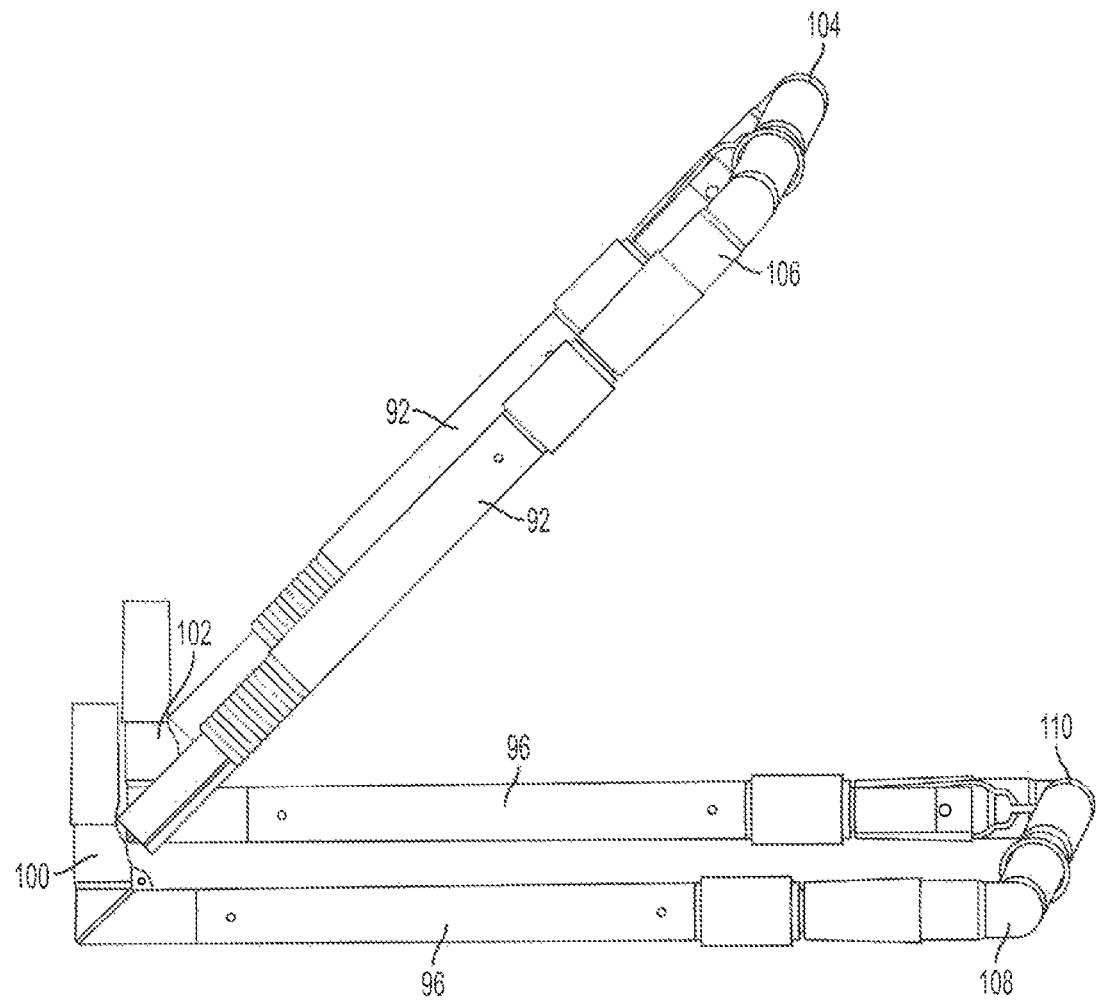
FIG. 17 is a perspective view of a collapsible sports goal according to an embodiment of the present invention in a stage of collapse.
Figure 18:
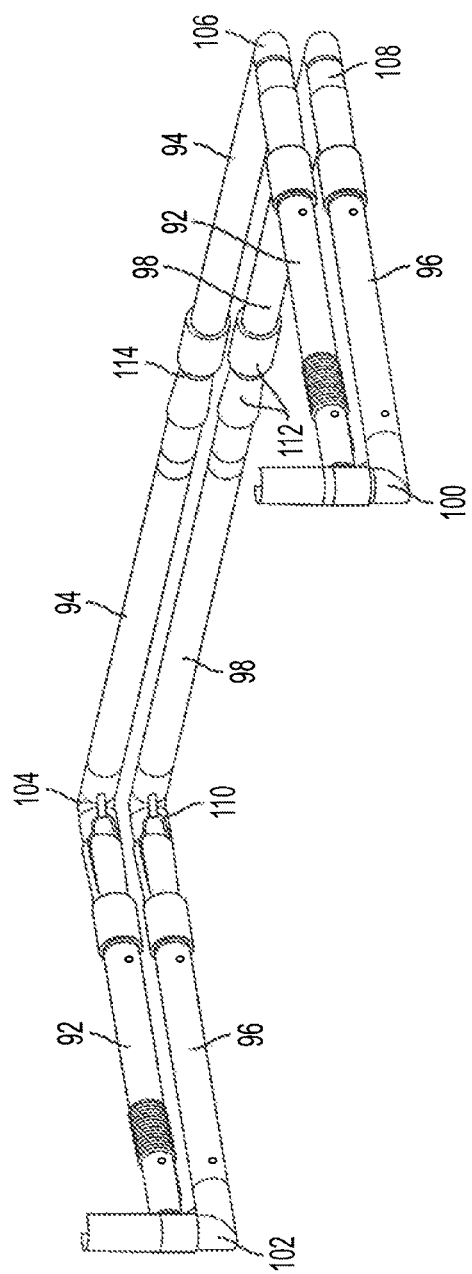
FIG. 18 is a perspective view of a collapsible sports goal according to an embodiment of the present invention in another stage of collapse.

FIG. 17 depicts sports goal 90 is a first stage of collapse. As shown in FIG. 17, angled joints 100 and 102 have been moved to a partially collapsed configuration and have been moved towards ground tubes 96. To fully collapse joints 100 and 102, the joints are further moved to the position shown in FIG. 18, wherein up tubes 92 rest proximate to ground tubes 96.

Figure 19:
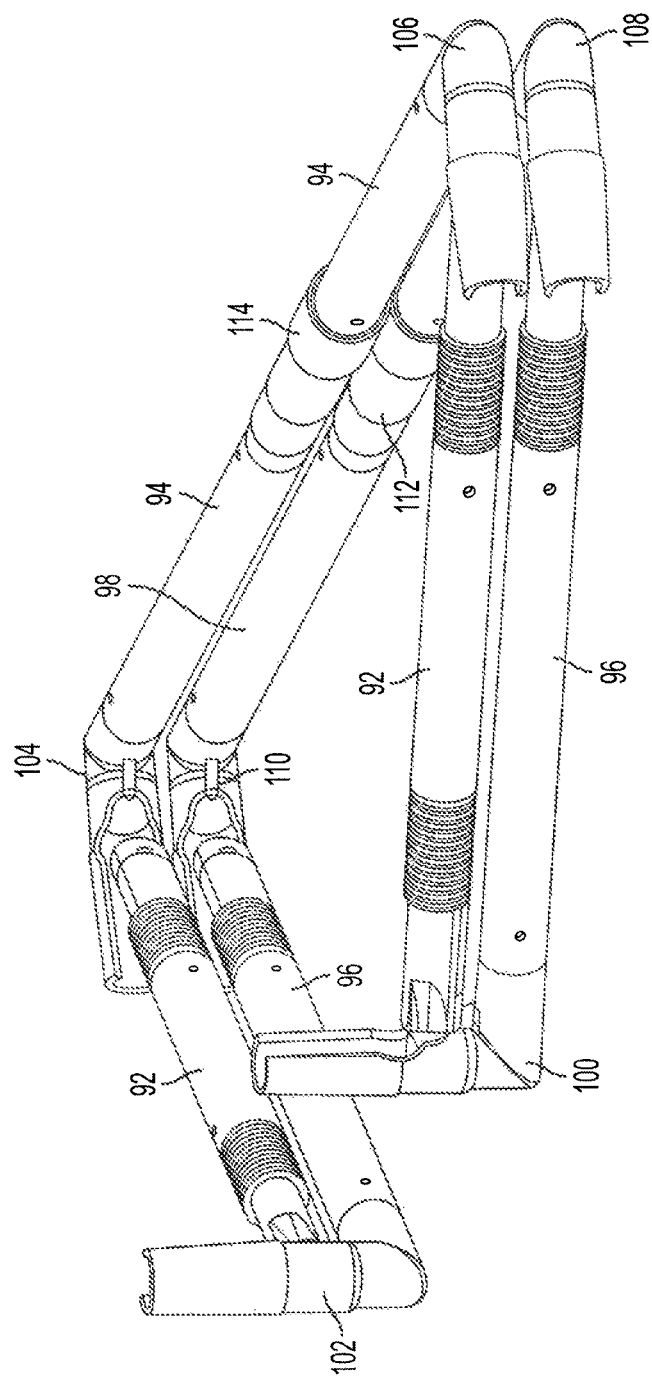
FIG. 19 is a perspective view of a collapsible sports goal according to an embodiment of the present invention in another stage of collapse.
Figure 20:
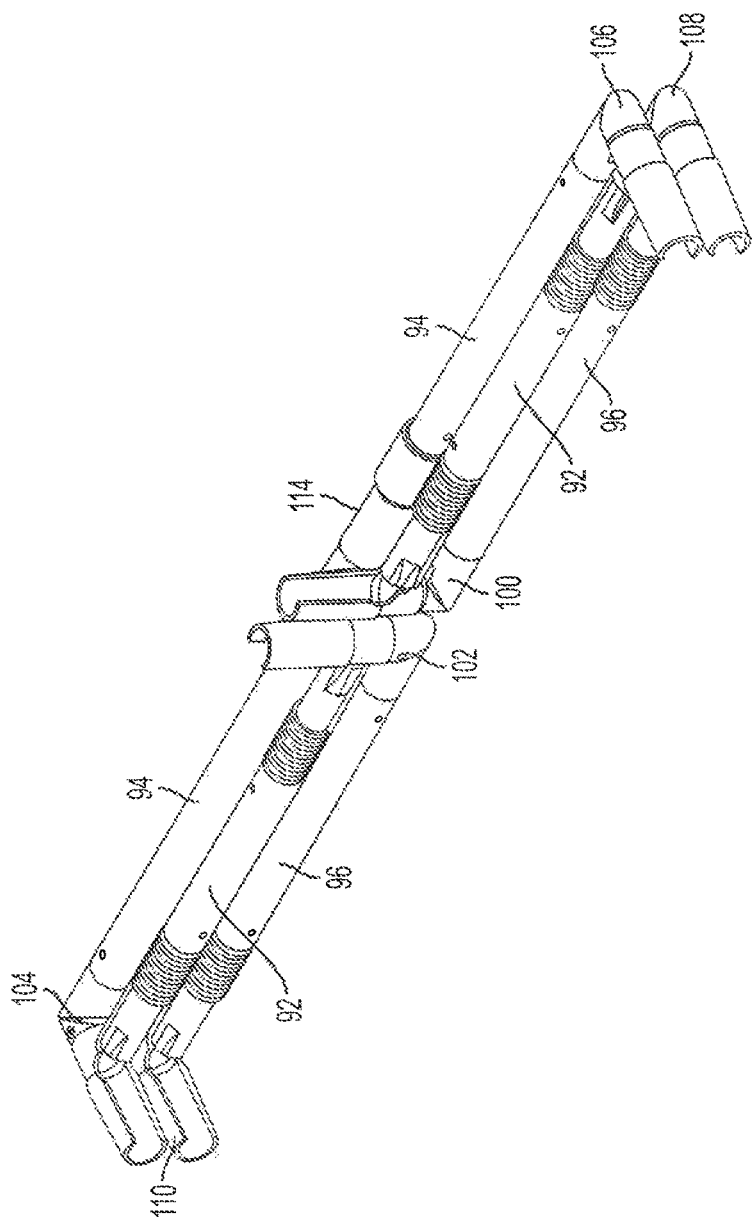
FIG. 20 is a perspective view of a collapsible sports goal according to an embodiment of the present invention in another stage of collapse.

FIGS. 19 and 20 depict sports goal 90 at another stage of collapse. In FIG. 19, elbow joints 104, 106, 108, and 110 have been moved to a partially collapsed position and have been moved towards crossbar tubes 94 and rear tubes 98. As shown in FIG. 20, elbow joints 104, 106, 108, and 110 are further moved such that up tubes 92 are proximate crossbar tubes 94 and ground tubes 96 are proximate to rear tubes 98.

Figure 21:
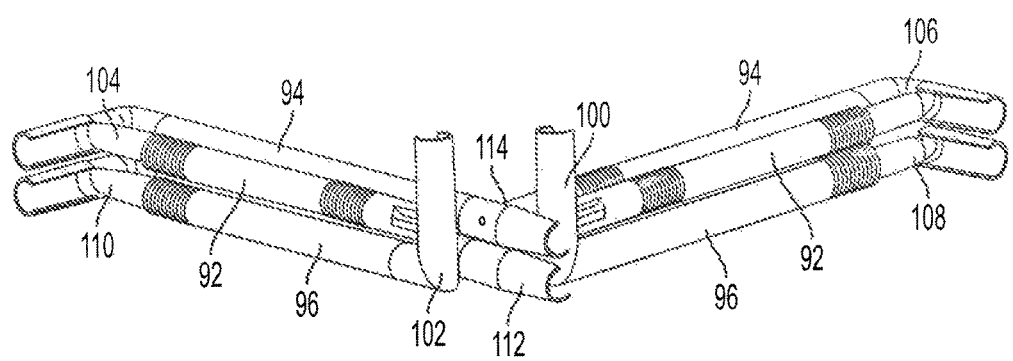
FIG. 21 is a perspective view of a collapsible sports goal according to an embodiment of the present invention in another stage of collapse.
Figure 22:
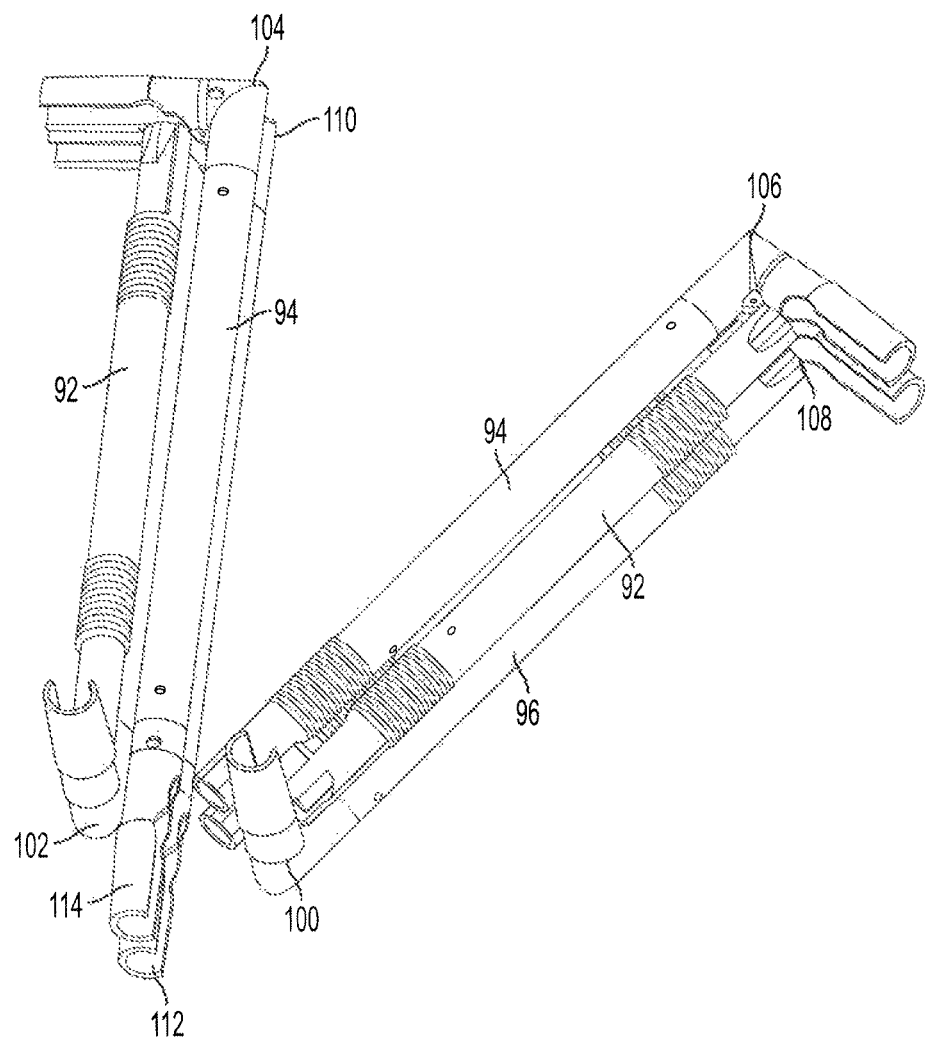
FIG. 22 is a perspective view of a collapsible sports goal according to an embodiment of the present invention in another stage of collapse.
Figure 23:
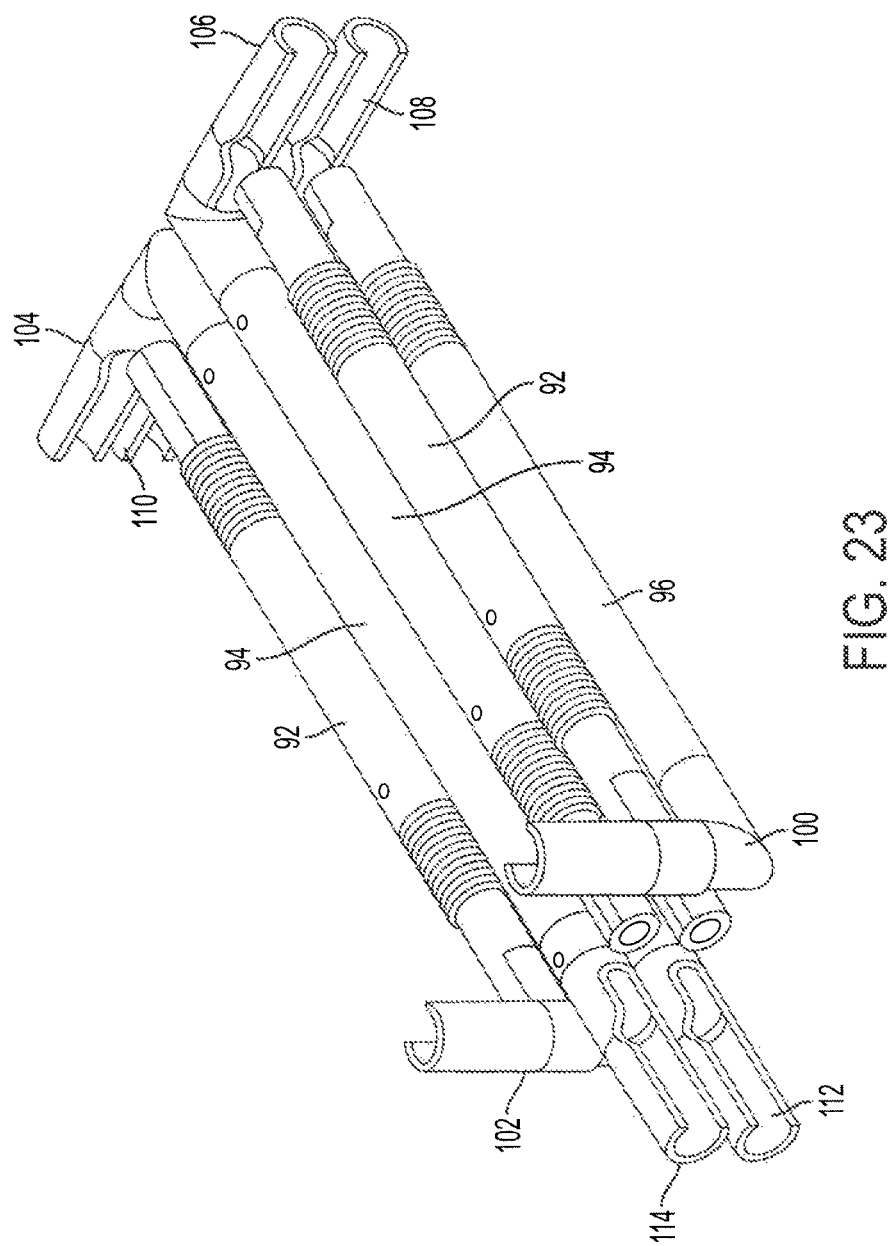
FIG. 23 is a perspective view of a collapsible sports goal according to an embodiment of the present invention in a fully collapsed configuration.

FIGS. 21-23 depict sports goal 90 at another stage of collapse. In FIG. 21, straight joints 112 and 114 have been moved to a partially collapsed position such that crossbar tubes 94 and rear tubes 98 move closer to parallel. As shown in FIGS. 22 and 23, straight joints 112 and 114 are further moved such that the two crossbar tubes 94 are adjacent, and preferably substantially parallel, to each other and the two rear tubes 98 are adjacent, and preferably substantially parallel, to each other. FIG. 23 depicts sports goal 90 in a fully collapsed configuration which facilitates easy movement and storage of sports goal 90.

It is understood that FIGS. 16-23 depict only one of many possible methods for collapsing sports goal 90. Furthermore, it is understood that sports goal 90 can be formed without using straight joints. Sports goal 90 can also be formed with only straight joints. Structures according to embodiments of the present invention can include more or fewer joints than depicted in FIGS. 16-24 depending on the desired size and shape of the structure. U.S. Pat. Nos. 5,681,231, 6,220,776, 6,561,931, and 7,377,714, and U.S. Patent Publication No. 2010/0184538, all of which name Francis J. Reeves as inventor and are assigned to the assignee of the present application, depict collapsible structures that can utilize joints according to the present invention, and are incorporated by reference in their entirety herein.

Up tubes 92, crossbar tubes 94, ground tubes 96, and rear tubes 98 can be constructed from a variety of materials. Preferably, tubes 92, 94, 96, and 98 are formed from a metal or a plastic material. Tubes 92, 94, 96, and 98 can be formed of a synthetic polymer such as a polyamide. Tubes 92, 94, 96, and 98 can be formed of a semicrystalline polyamide such as polycaprolactam. The synthetic polymer used to form tubes 92, 94, 96, and 98 can be supplemented with a fiberglass reinforcement to add strength. Tubes 92, 94, 96, and 98 components can also be formed of acrylonitrile butadiene styrene (ABS), polypropylene, or polycarbonate materials. A combination of ABS and polycarbonate material can be used. Rubber or other elastomer materials can also be used.

Figure 24:
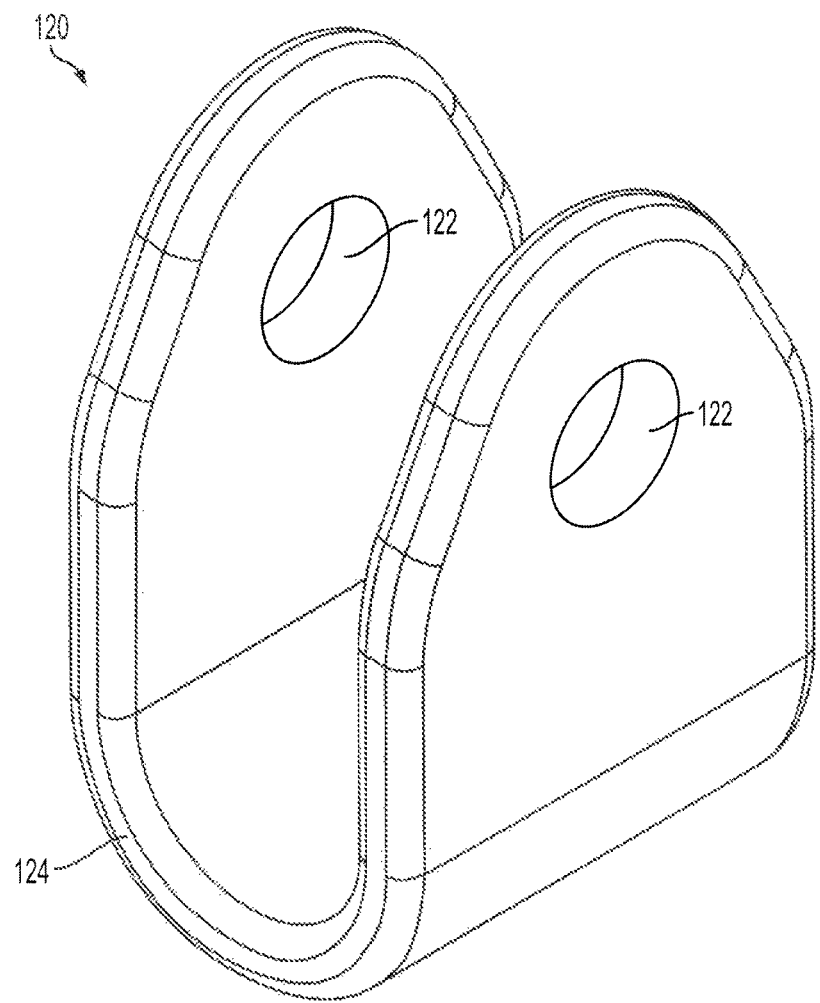
FIG. 24 is a perspective view of a fastening clip according to an embodiment of the present invention.

FIG. 24 is a perspective view of a fastening clip 120 according to an embodiment of the present invention. Fastening clip 120 has two through holes 122. Fastening clip 120 is configured to mate with fastening mount 16 to secure netting or other material to the receiving member 10. A portion of the material is passed through curved portion 124 of fastening clip 120. The fastening clip 120 is then positioned over a hole formed in fastening mount 16 such that through-holes 122 align with the hole in fastening mount 16. To secure fastening clip 120 to fastening mount 16, a screw or bolt is passed through through-holes 122 and the hole in fastening mount 16. It is understood that other methods, such as a clip, can be used to secure fastening clip 120 to receiving members 10 or 20. It is also understood that fastening mount 16 can be formed on mating member 30 or on any other post or part of the collapsible structures described herein.

Figure 25:
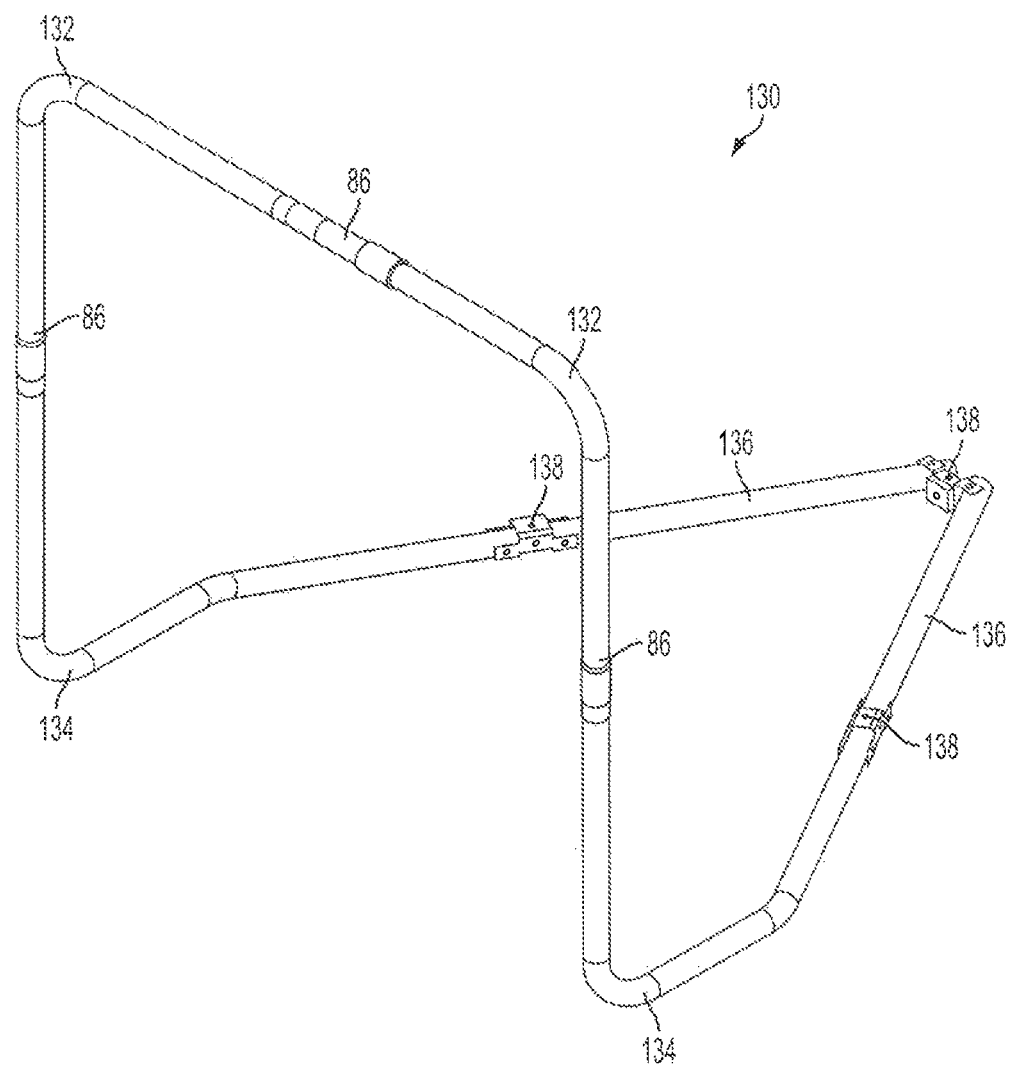
FIG. 25 is a perspective view of a collapsible sports goal according to another embodiment of the present invention in a fully assembled configuration.
Figure 26:
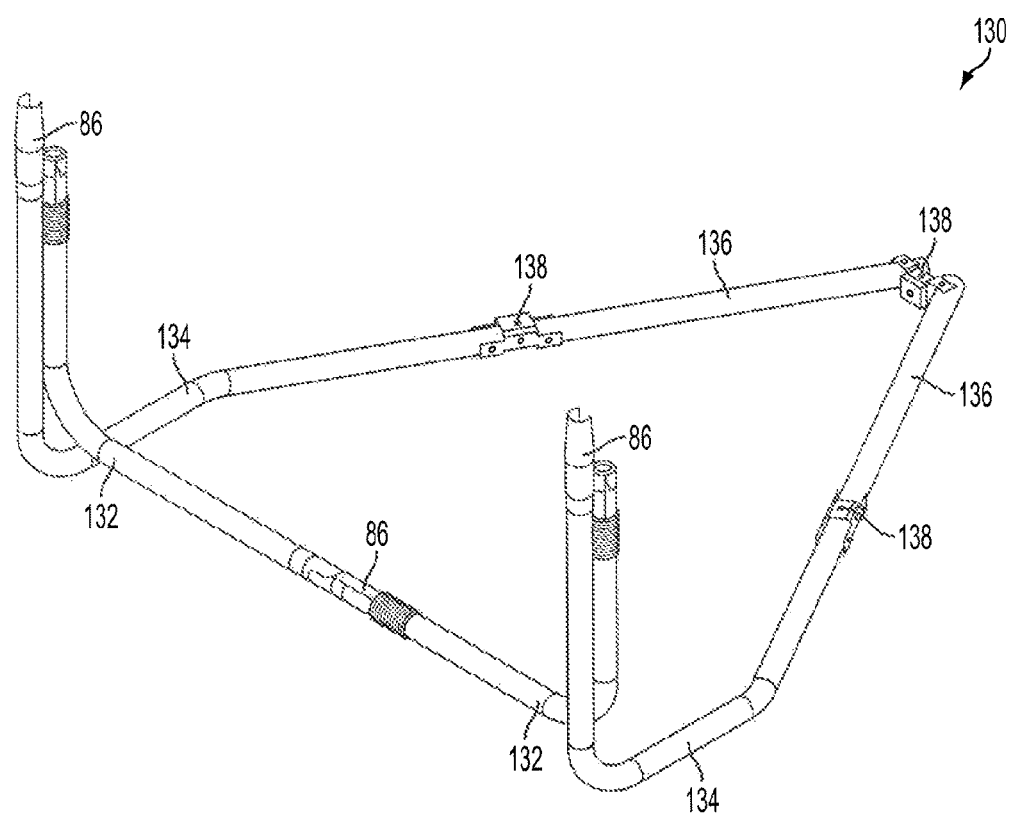
FIG. 26 is a perspective view of the collapsible sports goal of FIG. 25 in a partially collapsed configuration.

FIG. 25 is a perspective view of a collapsible goal 130 according to another embodiment of the present invention in a fully assembled configuration. Collapsible goal 130 is particularly suitable as a lacrosse goal or a reduced-size lacrosse goal. Collapsible goal 130 includes three straight joints 86. Collapsible sports goal 130 further includes two corner posts 132. Corner posts 132 are angled, preferably at an angle of approximately 90 degrees. It is understood that posts 132 can be angled to any other angle in embodiments of the present invention. Each corner post 132 is connected at each end to a straight joint 86. Collapsible goal 130 further includes bottom posts 134. Each bottom post 134 is angled at two locations and extends from a straight joint 86 at one end to a bracket 138 at its opposite end, as shown in FIG. 25. Although collapsible goal 130 is depicted in FIG. 25 featuring angled posts 132 and 134, it is understood that the angles in collapsible goal 130 can be achieved using angled joints 84, as described herein with reference to collapsible goal 90. Collapsible goal 130 also includes rear posts 136, each of which is connected at one end to a corner post 134 via a bracket 138 and at the other end to the other rear post 136 by another bracket 138. Brackets 138 allow the posts to pivot in order to collapse the joints formed by the brackets. FIG. 26 is a perspective view of collapsible goal 130 in a partially collapsed configuration. As shown in FIG. 26, the straight joint 86 connecting corner posts 132 to bottom posts 134 have been collapsed. Although not depicted, it is understood that collapsible goal 130 can be further collapsed by collapsing the straight joint 86 connecting the two corner posts 132 together, and also by pivoting rear posts 136 forward at brackets 138. It is further understood that angled or straight joints according to embodiments of the present invention can be used in place of brackets 138.

The foregoing description of the invention has been presented for purposes of illustration and description. It is not intended to be exhaustive or to limit the invention to the precise form disclosed. Other modifications and variations may be possible in light of the above teachings. The embodiments and examples were chosen and described in order to best explain the principles of the invention and its practical application and to thereby enable others skilled in the art to best utilize the invention in various embodiments and various modifications as are suited to the particular use contemplated. It is intended that the appended claims be construed to include other alternative embodiments of the invention.

What is claimed is:

1. A joint assembly for a collapsible structure, the joint assembly comprising:
    a mating member, wherein the mating member includes a tip section having a first end, a second end and a raised wedge on an exterior surface thereof that is characterized by a longitudinal slope;
    a receiving member including a having a first end and a second end and defining a lumen having an internal surface, the socket section having a longitudinal slot through which the tip section of the mating member is received into the lumen, the socket section having a frustoconical exterior surface the diameter of which decreasing from the second end to the first end in accordance with the longitudinal slope, the frustoconical exterior surface being in circumferential alignment with the raised wedge on the tip section in an overlap region between the socket section and the tip section of the mating member when the tip section is positioned in the lumen of the receiving member; and
    a flexible member coupled to the receiving member and to the first end of the mating member.

2. The joint assembly of claim 1, further comprising a slider at least partially encompassing the mating member and displaceable along a portion of the length of the mating member.

3. The joint assembly of claim 2, wherein, the slider is sized and shaped to slide over the overlap region between the socket section of the receiving member and the tip section of the mating member when the tip section is positioned in the lumen of the receiving member so as to retain the tip section of the mating member within the lumen of the receiving member.

4. The joint assembly of claim 3, wherein the slider has an interior surface that is complementary to the frustoconical surface in the overlap region formed by the aligned raised wedge of the tip section and the exterior surface of the socket section.

5. The joint assembly of claim 2, wherein the mating member includes a plurality of circumferential ridges extending around a portion thereof that is removed from the tip section thereof.

6. The joint assembly of claim 5, wherein the slider has a protrusion extending from the interior surface of the slider so as to engage adjacent circumferential ridges to retain the slider in position thereat.

7. The joint assembly of claim 6, wherein the internal surface of the slider includes a non-sloped section of substantially constant internal diameter over the length thereof.

8. The joint assembly of claim 7, wherein the protrusion extends from the non-sloped section of the internal surface of the slider.

9. The joint assembly of claim 8, wherein the internal surface of the slider includes a rear section, the internal diameter of which varies along the length thereof in accordance with another slope.

10. The joint assembly of claim 9, wherein the slider includes a front edge and a rear edge, and where the mating section extends from the front edge of the slider.

11. The joint assembly of claim 10, wherein the rear section extends from the rear edge of the slider.

12. The joint assembly of claim 11, wherein the non-sloped section extends between the mating section and the rear section.

13. The joint assembly of claim 1, wherein the receiving member further includes a relief area adjacent to the second end of the socket section.

14. The joint assembly of claim 13, wherein the relief area includes a relief slot that is sized and shaped to permit passage of the flexible connector as the mating member and the receiving member are relatively displaced.

15. The joint assembly of claim 1, wherein the receiving member is formed with an angled portion.

16. The joint assembly of claim 1, further comprising a fastening mount positioned on the receiving member such that material can be secured to the joint assembly thereat.

17. A joint assembly for a collapsible structure, the joint assembly comprising:
    a mating member comprising a tip section having a first end and a second end and a raised wedge on an exterior surface thereof that is characterized by a longitudinal slope;
    a receiving member including a socket section having a first end and a second end and defining a lumen having an internal surface, the socket section including a longitudinal slot through which the tip section of the mating member is compelled into the lumen, the socket section having a frustoconical exterior surface, the external diameter of which decreasing along the length thereof in accordance with the longitudinal slope, the frustoconical exterior surface being in circumferential alignment with the raised wedge on the tip section in an overlap region between the socket section of the receiving member and the tip section when the tip section is positioned in the lumen of the receiving member;
    a flexible member coupled to the receiving member and to the first end of the mating member; and
    a slider configured to at least partially encompass the mating member and to be selectively displaceable thereon, the slider including an internal surface having a mating section, the internal diameter of which varies along a length thereof in accordance with the longitudinal slope of the socket section so as to form a non-locking taper fit between the socket section and the slider.

18. A joint assembly comprising:
    a receiving member and a mating member mechanically coupled one to another by a flexible member so as to be relatively displaceable while remaining coupled, a tip section of the mating member being selectively received into a socket section of the receiving member in an overlap region between the receiving member and the mating member, the mating member and the receiving member having respective surfaces that align in the overlap region to define a circumferential frustoconical surface exterior around both the receiving member and the mating member; and a slider having an interior surface that is complementary to the frustoconical surface around the receiving member and the mating member in the overlap region, the slider being coaxially aligned with and selectively displaceable into the overlap region to a location therein at which a non-locking taper fit between the frustoconical surface around the receiving member and the mating member and the complementary interior surface of the slider is formed.

19. The joint assembly of claim 18, wherein the socket section has a longitudinal slot formed therein communicating the exterior surface of the socket section with an interior surface of a chamber into which the tip section of the mating member is received, the longitudinal slot being resiliently deformable such that portions of the tip section that are broader than the longitudinal slot is wide can be compelled through the slot and be received into the chamber.

20. The joint assembly of claim 19, wherein the tip section has a proximal end at which the flexible member is mechanically coupled and a distal end opposite the proximal end, the tip section including a shaped tip at the proximal end thereof having a cross-sectional shape characterized on a line bisecting the cross-section of the tip section to extend from a top portion thereof to a bottom portion thereof, the cross-sectional shape of the shaped tip being narrower at the bottom portion of the tip section than at the top portion thereof.

21. The joint assembly of claim 20, wherein the distal end of the tip section has a cross-sectional shape defined by concentric circular sectors, a first sector having a cross-sectional diameter less than that of a second sector while the first sector extends through an angle greater than the second sector, the circular sectors being centrally aligned on the line bisecting the tip section.

22. The joint assembly of claim 21, wherein the cross-sectional diameter of the first sector is substantially equal to the diameter of the interior surface of the chamber in the socket section of the receiving member.

23. The joint assembly of claim 21, wherein the shaped tip extends from the proximal end of tip section a predetermined distance towards the distal end thereof at which location the cross-sectional shape of the shaped tip transitions to the cross-sectional shape of the first sector.

24. The joint assembly of claim 23, wherein the receiving member includes a relief area adjacent to the socket section at which the flexible member is mechanically coupled, the relief area having a stopped slot formed therein that continues the longitudinal slot in the socket section into the relief area.

25. The joint assembly of claim 24, wherein the coupling of the flexible member at the relief area of the receiving member and the coupling of the flexible member of at the proximal end of the tip section of the mating member align the bottom portion of the shaped tip with the longitudinal slot at one end of the region of overlap.

26. The joint assembly of claim 25, wherein the coupling of the flexible member at the relief area of the receiving member and the coupling of the flexible member of at the proximal end of the tip section of the mating member constrains the relative displacement between the receiving member and the mating member such that the bottom portion of the shaped tip precedes other portions of the tip section through the longitudinal slot.

27. The joint assembly of claim 26, wherein the second sector of the tip section occupies the longitudinal slot over the length of the overlap region when the first sector is received in the chamber of the socket section.

28. The joint assembly of claim 27, wherein the tip section and the socket section are symmetrical about the bisecting line of the tip section when the tip section is received into the socket section.

29. The joint assembly of claim 19, wherein the diameter of the exterior surface of socket section increases from a distal end thereof to a proximal end thereof to define the frustoconical surface on the receiving member.

30. The joint assembly of claim 29, wherein tip section includes a circular sector portion that occupies the longitudinal slot in the overlap region when the tip section is received into the socket section.

31. The joint assembly of claim 30, wherein the circular sector portion includes a raised wedge formed on an exterior surface thereof that extends from a distal end of the tip section towards a proximal end of the tip section at which the mating member is mechanically coupled to the flexible member, the raised wedge defining the frustoconical surface on the mating member that aligns with the exterior surface of the socket section to define the circumferential frustoconical surface around both the receiving member and the mating member in the overlap region.

32. The joint assembly of claim 18, wherein the slider is mounted on the mating member and is displaceable thereon into and out of the tip section.

33. The joint assembly of claim 32, wherein the mating member includes a plurality of circumferential ridges adjacent to a distal end of the tip section that is opposite a proximal end of the tip section at which the mating member is mechanically coupled to the flexible member, the ridges mechanically acting on the slider to retain the slider in a selected position until moved therefrom by a predetermined force.

34. The joint assembly of claim 33, wherein the slider includes an interior cylindrical surface adjacent to the interior frustoconical surface at which the ridges of the mating member mechanically act on the slider.

35. The joint assembly of claim 34, wherein the interior cylindrical surface of slider includes at least one protrusion formed thereon that engage between adjacent circumferential ridges to retain the slider in the selected position.

36. The joint assembly of claim 35, wherein the diameter of the interior cylindrical surface of the slider is equal to the smallest diameter of the interior frustoconical surface of the slider.

37. The joint assembly of claim 36, wherein the protrusion is formed on the interior cylindrical surface of the slider at a location such that when the non-locking taper fit is formed between the frustoconical surface around the receiving member and the mating member and the complementary frustoconical surface of the slider, the protrusion is removed from contact with the socket section of the receiving member in the overlap region.

38. The joint assembly of claim 18, wherein the mating member and the receiving member each comprise a pipe fitting end by which components of a collapsible structure can be joined by the joint assembly.

39. The joint assembly of claim 38, wherein the pipe fitting ends of both the mating member and the receiving member are coaxially aligned.

40. The joint assembly of claim 38, wherein axes of the pipe fitting ends of the mating member and the receiving member define an angle other than 180 degrees.

41. The joint assembly of claim 40, wherein axes of the pipe fitting ends of the mating member and the receiving member define a right angle.

42. The joint assembly of claim 41, wherein the mating member, the receiving member and the slider are formed from a polymeric material.

* * * * *

UNITED STATES PATENT AND TRADEMARK OFFICE
CERTIFICATE OF CORRECTION

| | | |
|---|---|---|
| PATENT NO. | : 8,657,521 B2 | Page 1 of 1 |
| APPLICATION NO. | : 13/006384 | |
| DATED | : February 25, 2014 | |
| INVENTOR(S) | : Reeves | |

It is certified that error appears in the above-identified patent and that said Letters Patent is hereby corrected as shown below:

In the Claims

Column 13, line 33, claim 1, after "including a", insert --socket section--;

Column 15, line 6, claim 18, delete "surface exterior" insert --exterior surface--;

Column 15, line 58, claim 25, after "flexible member", delete "of"; and

Column 15, line 65, claim 26, after "flexible member" delete "of".

Signed and Sealed this
Ninth Day of December, 2014

Michelle K. Lee
*Deputy Director of the United States Patent and Trademark Office*